United States Patent
Kittichokechai et al.

(10) Patent No.: US 12,238,729 B2
(45) Date of Patent: Feb. 25, 2025

(54) DOWNLINK CONTROL INFORMATION (DCI) SIZE HANDLING

(71) Applicant: Telefonaktiebolaget LM Ericsson (publ), Stockholm (SE)

(72) Inventors: Kittipong Kittichokechai, Järfälla (SE); Jianwei Zhang, Solna (SE); Yufei Blankenship, Kildeer, IL (US); Alexey Shapin, Lulea (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 691 days.

(21) Appl. No.: 17/429,787

(22) PCT Filed: Feb. 14, 2020

(86) PCT No.: PCT/EP2020/053881
§ 371 (c)(1),
(2) Date: Aug. 10, 2021

(87) PCT Pub. No.: WO2020/165406
PCT Pub. Date: Aug. 20, 2020

(65) Prior Publication Data
US 2022/0124788 A1     Apr. 21, 2022

Related U.S. Application Data

(60) Provisional application No. 62/806,094, filed on Feb. 15, 2019.

(51) Int. Cl.
*H04W 72/23* (2023.01)
*H04L 1/00* (2006.01)
(Continued)

(52) U.S. Cl.
CPC ........... *H04W 72/23* (2023.01); *H04L 1/0008* (2013.01); *H04W 24/08* (2013.01); *H04W 72/1263* (2013.01)

(58) Field of Classification Search
CPC . H04W 72/23; H04W 24/08; H04W 72/1263; H04L 1/0008; H04L 5/0007; H04L 5/0053
See application file for complete search history.

(56) References Cited

U.S. PATENT DOCUMENTS

2019/0274032 A1* 9/2019 Chatterjee ................ H04L 5/00
2019/0363843 A1* 11/2019 Gordaychik ............. H04L 1/08
(Continued)

OTHER PUBLICATIONS

International Search Report and Written Opinion dated May 15, 2020 for International Application No. PCT/EP2020/053881 filed Feb. 14, 2020, consisting of 18-pages.
(Continued)

*Primary Examiner* — Rina C Pancholi
(74) *Attorney, Agent, or Firm* — Weisberg I.P. Law, P.A.

(57) ABSTRACT

A method and apparatus are disclosed for handling DCI size alignment. In one embodiment, a network node is configured to perform a downlink control information, DCI, size alignment procedure based at least in part on a limit of a total number of different DCI sizes that a wireless device, WD, is configured to monitor. The network node is further configured to transmit a DCI message, the DCI message generated according to the DCI alignment procedure. In one embodiment, a WD is configured to monitor a cell for a downlink control information, DCI, message. The WD is further configured to receive and/or decode the DCI message, the DCI message being generated according to a DCI alignment procedure in which a size of the DCI is based at least in part on a limit of a total number of different DCI sizes that the WD is configured to monitor.

22 Claims, 9 Drawing Sheets

(51) Int. Cl.
*H04W 24/08* (2009.01)
*H04W 72/1263* (2023.01)

(56) References Cited

U.S. PATENT DOCUMENTS

2021/0153228 A1* 5/2021 Shi ..................... H04W 72/569
2021/0345305 A1* 11/2021 Takeda ................ H04W 72/23

OTHER PUBLICATIONS

3GPP TS 38.212 V15.4.0; 3rd Generation Partnership Project; Technical Specification Group Radio Access Network; NR; Multiplexing and channel coding (Release 15), Dec. 2018, consisting of 100-pages.
3GPP TSG RAN WG1 Meeting #92bis R1-1805630; Title: Summary of 7.2.2 Study of necessity of a new DCI format; Agenda Item: 7.2.2; Source: Huawei, HiSilicon; Document for: Discussion and decision; Date and Location: Apr. 16-20, 2018, Sanya, China, consisting of 24-pages.
3GPP TSG RAN WG1 Meeting #93 R1-1806619; Title: DCI contents and formats for URLLC; Agenda Item: 7.1.3.1.4; Source: LG Electronics; Document for: Discussion and decision; Date and Location: May 21-25, 2018, Busan, Korea, consisting of 5-pages.
3GPP TSG RAN WG1 Ad Hoc Meeting 1901 Tdoc R1-1900158; Title: PDCCH enhancements for NR URLLC; Agenda Item: 7.2.6.1.1; Source: Ericsson; Document for: Discussion, Decision; Date and Location: Jan. 21-25, 2019, Taipei, Taiwan, consisting of 20-pages.
3GPP TSG-RAN WG1 Ad-Hoc Meeting 1901 Tdoc R1-1900927; Title: On the PDCCH enhancements for NR URLLC; Agenda Item: 7.2.6.1.1; Source: Nokia, Nokia Shanghai Bell; Document for: Discussion and Decision; Date and Location: Jan. 21-24, 2019, Taipei, Taiwan, consisting of 15-pages.
Japanese Decision to Grant and English machine translation dated Jan. 31, 2023 for Application No. 2021-546880, consisting of 5 pages.
3GPP TSG-RAN WG1 Meeting #93 R1-1806020; Title: DCI Contents and Formats for URLLC; Agenda Item: 7.1.3.1.4; Source: Ericsson; Document for: Discussion, Decision; Location and Date: Busan, Korea, May 21-25, 2018, consisting of 8 pages.

* cited by examiner

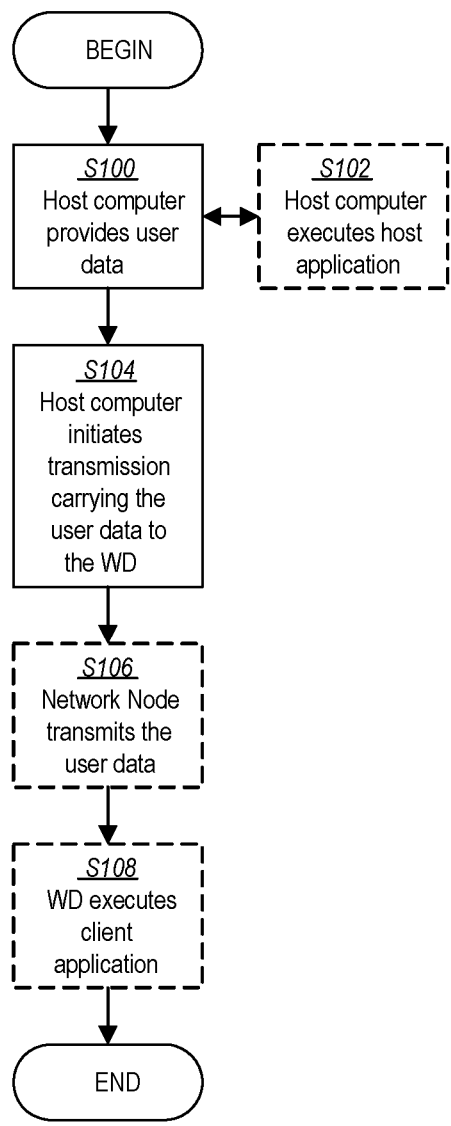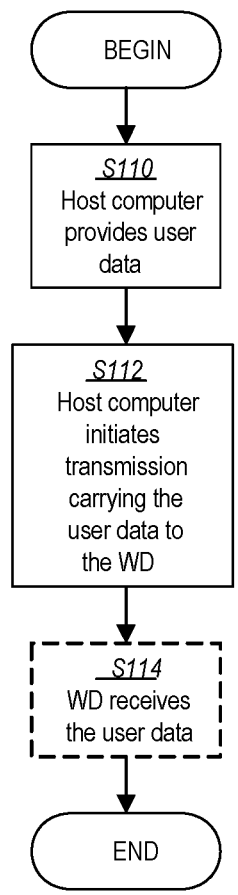
FIG. 3
FIG. 4

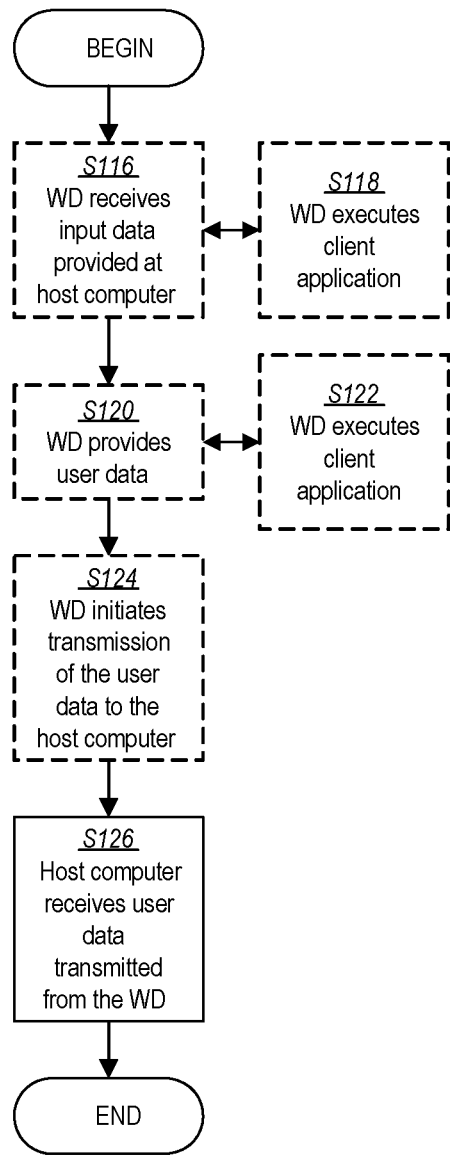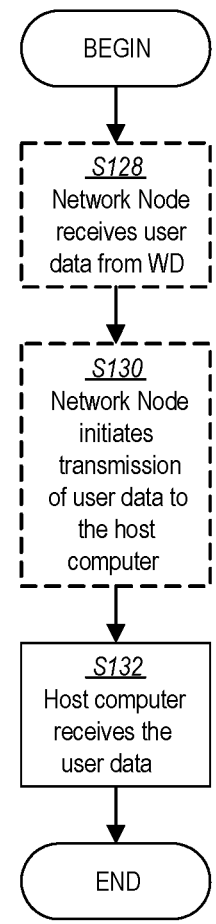
FIG. 5
FIG. 6

DOWNLINK CONTROL INFORMATION (DCI) SIZE HANDLING

CROSS-REFERENCE TO RELATED APPLICATIONS

This application is a Submission Under 35 U.S.C. § 371 for U.S. National Stage Patent Application of International Application No.: PCT/EP2020/053881, filed Feb. 14, 2020 entitled "DOWNLINK CONTROL INFORMATION (DCI) SIZE HANDLING," which claims priority to U.S. Provisional Application No. 62/806,094, filed Feb. 15, 2019, entitled "DOWNLINK CONTROL INFORMATION (DCI) SIZE HANDLING," the entireties of both of which are incorporated herein by reference.

FIELD

The present disclosure relates to wireless communications, and in particular, to downlink control information (DCI) size handling.

BACKGROUND

Ultra-reliable low latency communication (URLLC) requirements on reliability and latency are very strict, e.g., at least 99.999% reliability within 1 millisecond (ms) one-way latency. To achieve such high reliability requirements, each physical channel including a physical downlink control channel (PDCCH) should be highly reliable.

In the $3^{rd}$ Generation Partnership Project (3GPP) New Radio (NR) Release (Rel.) 15 (also known as "5G"), there are two main DCI formats for unicast data scheduling, namely the fallback DCI formats 0-0/1-0, and the non-fallback DCI formats 0-1/1-1. The fallback DCI supports resource allocation type 1 where the DCI size depends on the size of bandwidth part. The fallback DCI is intended for a single transport block (TB) transmission with limited flexibility. On the other hand, the non-fallback DCI format can provide flexible scheduling with multi-layer transmission.

Due to complexity constraints at the wireless device (WD), in 3GPP Rel-15, there also exists a limit on the total number of DCI sizes that the WD should monitor for the cell, i.e., three different sizes for DCI with cyclic redundancy check (CRC) scrambled by Cell-Radio Network Temporary Identifier (C-RNTI) and one additional for other Radio Network Temporary Identifiers (RNTIs).

Since size of each DCI format can be different depending on the size of bandwidth parts or different configurations, a DCI size alignment procedure was introduced to ensure that the limit on the total number of DCI sizes for the WD to monitor is fulfilled.

As a reference, the DCI size alignment procedure from $3^{rd}$ Generation Partnership Project (3GPP) Technical Specification (TS) 38.212 v15.4 is shown below.

Section 7.3.1.0 of 3GPP TS 38.212 v15.4—DCI size alignment

If necessary, padding or truncation is be applied to the DCI formats according to the following steps executed in the order below (clauses referenced in the below are from 3GPP TS 38.212 v51.4):
Step 0:
   Determine DCI format 0_0 monitored in a common search space, for example, according to clause 7.3.1.1.1 where $N_{RB}^{UL,BWP}$ is the size of the initial uplink (UL) bandwidth part.
   Determine DCI format 1_0 monitored in a common search space, for example, according to clause 7.3.1.2.1 where $N_{RB}^{DL,BWP}$ is given by:
      the size of CORESET 0 if CORESET 0 is configured for the cell; and
      the size of initial downlink (DL) bandwidth part if CORESET 0 is not configured for the cell.
   If DCI format 0_0 is monitored in common search space and if the number of information bits in the DCI format 0_0 prior to padding is less than the payload size of the DCI format 1_0 monitored in common search space for scheduling the same serving cell, a number of zero padding bits are generated for the DCI format 0_0 until the payload size equals that of the DCI format 1_0.
   If DCI format 0_0 is monitored in common search space and if the number of information bits in the DCI format 0_0 prior to truncation is larger than the payload size of the DCI format 1_0 monitored in common search space for scheduling the same serving cell, the bitwidth of the frequency domain resource assignment field in the DCI format 0_0 is reduced by truncating the first few most significant bits such that the size of DCI format 0_0 equals the size of the DCI format 1_0.
Step 1:
   Determine DCI format 0_0 monitored in a WD-specific search space, for example, according to clause 7.3.1.1.1 where $N_{RB}^{UL,BWP}$ is the size of the active UL bandwidth part.
   Determine DCI format 1_0 monitored in a WD-specific search space, for example, according to clause 7.3.1.2.1 where $N_{RB}^{DL,BWP}$ is the size of the active DL bandwidth part.
   If DCI format 0_0 is monitored in WD-specific search space and if the number of information bits in the DCI format 0_0 prior to padding is less than the payload size of the DCI format 1_0 monitored in WD-specific search space for scheduling the same serving cell, zeros shall be appended to the DCI format 0_0 until the payload size equals that of the DCI format 1_0.
   If DCI format 1_0 is monitored in WD-specific search space and if the number of information bits in the DCI format 1_0 prior to padding is less than the payload size of the DCI format 0_0 monitored in WD-specific search space for scheduling the same serving cell, zeros shall be appended to the DCI format 1_0 until the payload size equals that of the DCI format 0_0.
Step 2:
   If the size of DCI format 0_1 monitored in a WD-specific search space equals that of a DCI format 0_0/1_0 monitored in another WD-specific search space, one bit of zero padding shall be appended to DCI format 0_1.
   If the size of DCI format 1_1 monitored in a WD-specific search space equals that of a DCI format 0_0/1_0 monitored in another WD-specific search space, one bit of zero padding shall be appended to DCI format 1_1.
Step 3:
   If both of the following conditions are fulfilled the size alignment procedure is complete:
      the total number of different DCI sizes configured to monitor is no more than 4 for the cell; and
      the total number of different DCI sizes with C-RNTI configured to monitor is no more than 3 for the cell
Step 4:
   Otherwise:
      Remove the padding bit (if any) introduced in step 2 above.

Determine DCI format 1_0 monitored in a WD-specific search space, for example, according to clause 7.3.1.2.1 where $N_{RB}^{DL,BWP}$ is given by:
  the size of CORESET 0 if CORESET 0 is configured for the cell; and
  the size of initial DL bandwidth part if CORESET 0 is not configured for the cell.

Determine DCI format 0_0 monitored in a WD-specific search space, for example, according to clause 7.3.1.1.1 where $N_{RB}^{UL,BWP}$ is the size of the initial UL bandwidth part.

If the number of information bits in the DCI format 0_0 monitored in a WD-specific search space prior to padding is less than the payload size of the DCI format 1_0 monitored in WD-specific search space for scheduling the same serving cell, a number of zero padding bits are generated for the DCI format 0_0 monitored in a WD-specific search space until the payload size equals that of the DCI format 1_0 monitored in a WD-specific search space.

If the number of information bits in the DCI format 0_0 monitored in a WD-specific search space prior to truncation is larger than the payload size of the DCI format 1_0 monitored in WD-specific search space for scheduling the same serving cell, the bitwidth of the frequency domain resource assignment field in the DCI format 0_0 is reduced by truncating the first few most significant bits such that the size of DCI format 0_0 monitored in a WD-specific search space equals the size of the DCI format 1_0 monitored in a WD-specific search space.

The WD is not expected to handle a configuration that, after applying the above steps, results in:
  the total number of different DCI sizes configured to monitor is more than 4 for the cell; or
  the total number of different DCI sizes with C-RNTI configured to monitor is more than 3 for the cell; or
  the size of DCI format 0_0 in a WD-specific search space is equal to DCI format 0_1 in another WD-specific search space; or
  the size of DCI format 1_0 in a WD-specific search space is equal to DCI format 1_1 in another WD-specific search space. Accordingly, the existing DCI size alignment procedure above from 3GPP TS 38.212 can be summarized as follows:
  Align the size of fallback DCI formats 0_0 and 1_0 monitored in common search space (CSS).
  Align the size of fallback DCI formats 0_0 and 1_0 monitored in user-specific search space (USS).
  Ensure that the sizes of non-fallback DCI format 0_1/1_1 monitored in USS differ from the aligned size of fallback DCI formats 0_0/1_0 monitored in USS.
  Further align the size of fallback DCI formats 0_0/1_0 monitored in USS to that of fallback DCI formats 0_0 and 1_0 monitored in CSS if number of DCI sizes for WD to monitor exceed the limit, i.e., no more than 4 DCI sizes in total and no more than 3 DCI sizes with C-RNTI (i.e., with CRC scrambled by C-RNTI).

Due to the high reliability requirement of URLLC, a new specific DCI format with new DCI fields and configurable field size may be considered in a 3GPP Rel-16 study item. The purpose of a new DCI format may be to provide high reliability physical downlink control channel (PDCCH) with a small DCI size while ensuring high data scheduling flexibility and thus high data transmission reliability.

However, if a new DCI format is introduced with a configurable size that is different from those of existing formats, this can lead to a higher total number of different DCI sizes for a WD to monitor.

SUMMARY

Some embodiments advantageously provide methods and apparatuses for DCI size handling. In one embodiment, a network node is configured to perform a downlink control information, DCI, size alignment procedure based at least in part on a limit of a total number of different DCI sizes that a wireless device, WD, is configured to monitor; and transmit a DCI message, the DCI message generated according to the DCI alignment procedure.

In one embodiment, a WD is configured to monitor a cell for a downlink control information, DCI, message; and receive and/or decode the DCI message, the DCI message being generated according to a DCI alignment procedure in which a size of the DCI is based at least in part on a limit of a total number of different DCI sizes that the WD is configured to monitor.

According to some embodiments, a network node is configured to communicate with a wireless device, WD. The network node includes processing circuitry configured to determine whether the WD is configured to monitor a downlink control information, DCI, format for ultra-reliable low latency communications, URLLC. The processing circuitry is further configured to perform a DCI size alignment procedure based at least in part on at least one of: whether the URLLC DCI format comprises a downlink assignment DCI format that is of a same size as a size of an uplink grant DCI format; whether the URLLC DCI format is a same size as a size of a fallback DCI format; and whether the URLLC DCI format is a same size as a size of a non-fallback DCI format.

According to this aspect, in some embodiments, the DCI size alignment procedure includes adjusting a size of a DCI transmission by padding at least one of a non-fallback DCI format and a URLLC DCI format with at least one zero bit. In some embodiments, the padding includes aligning the size of non-fallback DCI formats 0_1 and 1_1. In some embodiments, the DCI size alignment procedure includes aligning a size of a URLLC DCI format for at least one of a downlink assignment and an uplink grant for the WD. In some embodiments, the DCI size alignment procedure is based at least in part on a limit of a total number of DCI sizes that the WD is configured to monitor. In some embodiments, when the limit is 3, the size of the URLLC DCI format in a WD-specific search space is not allowed to equal the size of DCI format 0_0 or 1_0 in another WD-specific search space. In some embodiments, the size of URLLC DCI format 0_2 or 1_2 in a WD-specific search space after being aligned is not allowed to equal the size of the DCI format 0_1 or 1_1 in another WD-specific search space. In some embodiments, the DCI size alignment procedure includes padding a shorter DCI format with zeros until the size of the shorter format is equal to a size of a longer DCI format. In some embodiments, the size of the DCI format 0_2 or 1_2 in a WD-specific search space after being aligned is not allowed to equal the size of the DCI format 0_1 or 1_1 in another WD-specific search space by appending one bit of zero padding to the DCI format 0_2 or 1_2. In some embodiments, when the limit is 4, a size of the URLLC DCI format for uplink grants is aligned with a size of the URLLC DCI format for downlink assignments. In some embodiments, the DCI alignment procedure ensures that a size of downlink DCI format 1_2 is not equal to a size of DCI format 1_0. In some embodiments, the DCI alignment procedure ensures that a size of uplink DCI format 0_2 is not equal to a size of DCI format 0_0. In some embodiments, when the limit is 5, a size of a URLLC DCI format in a WD-specific search space is not allowed to equal a size of a DCI format 0_0 or 1_0 in another WD-specific search space and the size of the URLLC DCI format in the WD-specific search space is not allowed to equal a size of a DCI format 0_1 or 1_1 in another WD-specific search space. In some embodiments, a size of DCI format 0_2 and a size of a DCI format 1_2 in a WD-specific search space are aligned. In some embodiments, when a number of information bits in the DCI format 0_2 is less than a payload size of the DCI format 1_2 monitored in the WD-specific search space for scheduling a same serving cell, the processing circuitry is further configured to append zeros to the DCI format 0_2 until a payload size of the DCI format 0_2 equals the payload size of the DCI format 1_2. In some embodiments, when a number of information bits in the DCI format 1_2 is less than a payload size of the DCI format 0_2 monitored in the WD-specific search space for scheduling a same serving cell, the processing circuitry is further configured to append zeros to the DCI format 1_2 until a payload size of the DCI format 12 equals the payload size of the DCI format 0_2.

According to another aspect, a method implemented in a network node configured to communicate with a wireless device, WD, includes determining whether the WD is configured to monitor a downlink control information, DCI, format for ultra-reliable low latency communications, URLLC. The method also includes performing a DCI size alignment procedure based at least in part on at least one of whether the URLLC DCI format comprises a downlink assignment DCI format that is of a same size as a size of an uplink grant DCI format; whether the URLLC DCI format is a same size as a size of a fallback DCI format; and whether the URLLC DCI format is a same size as a size of a non-fallback DCI format. In some embodiments, the DCI size alignment procedure includes adjusting a size of a DCI transmission by padding at least one of a non-fallback DCI format and a URLLC DCI format with at least one zero bit. In some embodiments, the padding includes aligning the size of non-fallback DCI formats 0_1 and 1_1. In some embodiments, the DCI size alignment procedure includes aligning a size of a URLLC DCI format for at least one of a downlink assignment and an uplink grant for the WD. In some embodiments, the DCI size alignment procedure is based at least in part on a limit of a total number of DCI sizes that the WD is configured to monitor. In some embodiments, when the limit is 3, the size of the URLLC DCI format in a WD-specific search space is not allowed to equal the size of DCI format 0_0 or 1_0 in another WD-specific search space. In some embodiments, the size of URLLC DCI format 0_2 or 1_2 in a WD-specific search space after being aligned is not allowed to equal the size of DCI format 0_1 or 1_1 in another WD-specific search space. In some embodiments, the DCI size alignment procedure includes padding a shorter DCI format with zeros until the size of the shorter format is equal to a size of a longer DCI format. In some embodiments, the size of DCI format 0_2 or 1_2 in a WD-specific search space after being aligned is not allowed to equal the size of DCI format 0_1 or 1_1 in another WD-specific search space by appending one bit of zero padding to the DCI format 0_2 or 1_2. In some embodiments, when the limit is 4, a size of the URLLC DCI format for uplink grants is aligned with a size of the URLLC DCI format for downlink assignments. In some embodiments, the DCI alignment procedure ensures that a size of downlink DCI format 1_2 is not equal to a size of DCI format 1_0. In some embodiments, the DCI alignment procedure ensures that a size of uplink DCI format 0_2 is not equal to a size of DCI format 0_0. In some embodiments, when the limit is 5, a size of a URLLC DCI format in a WD-specific search space is not allowed to equal a size of a DCI format 0_0 or 1_0 in another WD-specific search space and the size of the URLLC DCI format in the WD-specific search space is not allowed to equal a size of a DCI format 0_1 or 1_1 in another WD-specific search space. In some embodiments, a size of DCI format 0_2 and a size of a DCI format 1_2 in a WD-specific search space are aligned. In some embodiments, when a number of information bits in the DCI format 0_2 is less than a payload size of the DCI format 1_2 monitored in the WD-specific search space for scheduling a same serving cell, zeros are appended to the DCI format 0_2 until a payload size of the DCI format 0_2 equals the payload size of the DCI format 1_2. In some embodiments, when a number of information bits in the DCI format 1_2 is less than a payload size of the DCI format 0_2 monitored in the WD-specific search space for scheduling a same serving cell, zeros are appended to the DCI format 1_2 until a payload size of the DCI format 12 equals the payload size of the DCI format 0_2.

According to yet another aspect, a WD is configured to communicate with a network node, the WD comprising processing circuitry configured to monitor a cell for a downlink control information, DCI, message in an ultra-reliable low latency communications, URLLC, DCI format, The processing circuitry is further configured to decode the DCI message according to a DCI size alignment procedure that is based at least in part on at least one of: whether the URLLC DCI format comprises a downlink assignment DCI format that is of a same size as a size of an uplink grant DCI format; whether the URLLC DCI format is a same size as a size of a fallback DCI format; and whether the URLLC DCI format is a same size as a size of a non-fallback DCI format.

According to this aspect, in some embodiments, the DCI size alignment procedure includes at least adjusting a size of the DCI message by padding at least one of a non-fallback DCI format and a URLLC DCI format with at least one zero bit. In some embodiments, the DCI size alignment procedure includes at least aligning a size of a URLLC DCI format for at least one of a downlink assignment and an uplink grant for the WD. In some embodiments, the DCI size alignment procedure includes excluding or dropping at least one of a URLLC DCI format and a non-fallback DCI format from the DCI formats that the WD monitors via radio resource control (RRC) signaling. In some embodiments, the DCI size alignment procedure includes excluding or dropping at least one of a URLLC DCI format and a non-fallback DCI format from the DCI formats that the WD monitors based at least in part on a priority rule. In some embodiments, a size of the DCI message is based at least in part on a limit of a total number of different DCI sizes that the WD is configured to monitor.

According to another aspect, a method in a WD includes monitoring a cell for a downlink control information, DCI, message in an ultra-reliable low latency communications, URLLC, DCI format. The method further includes decoding the DCI message according to a DCI size alignment procedure that is based at least in part on at least one of: whether the URLLC DCI format comprises a downlink assignment DCI format that is of a same size as a size of an uplink grant DCI format; whether the URLLC DCI format is a same size as a size of a fallback DCI format; and whether the URLLC DCI format is a same size as a size of a non-fallback DCI format.

According to this aspect, in some embodiments, the DCI size alignment procedure includes at least adjusting a size of the DCI message by padding at least one of a non-fallback DCI format and a URLLC DCI format with at least one bit. In some embodiments, the DCI size alignment procedure includes at least aligning a size of a URLLC DCI format for at least one of a downlink assignment and an uplink grant for the WD. In some embodiments, the DCI size alignment procedure includes excluding or dropping at least one of a URLLC DCI format and a non-fallback DCI format from the DCI formats that the WD monitors via radio resource control (RRC) signaling. In some embodiments, the DCI size alignment procedure includes excluding or dropping at least one of a URLLC DCI format and a non-fallback DCI format from the DCI formats that the WD monitors based at least in part on a priority rule. In some embodiments, a size of the DCI message is based at least in part on a limit of a total number of different DCI sizes that the WD is configured to monitor.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 3 is a flowchart illustrating exemplary methods implemented in a communication system including a host computer, a network node and a wireless device for executing a client application at a wireless device according to some embodiments of the present disclosure;

FIG. 4 is a flowchart illustrating exemplary methods implemented in a communication system including a host computer, a network node and a wireless device for receiving user data at a wireless device according to some embodiments of the present disclosure;

FIG. 5 is a flowchart illustrating exemplary methods implemented in a communication system including a host computer, a network node and a wireless device for receiving user data from the wireless device at a host computer according to some embodiments of the present disclosure;

FIG. 6 is a flowchart illustrating exemplary methods implemented in a communication system including a host computer, a network node and a wireless device for receiving user data at a host computer according to some embodiments of the present disclosure;

DETAILED DESCRIPTION

Figure 1:
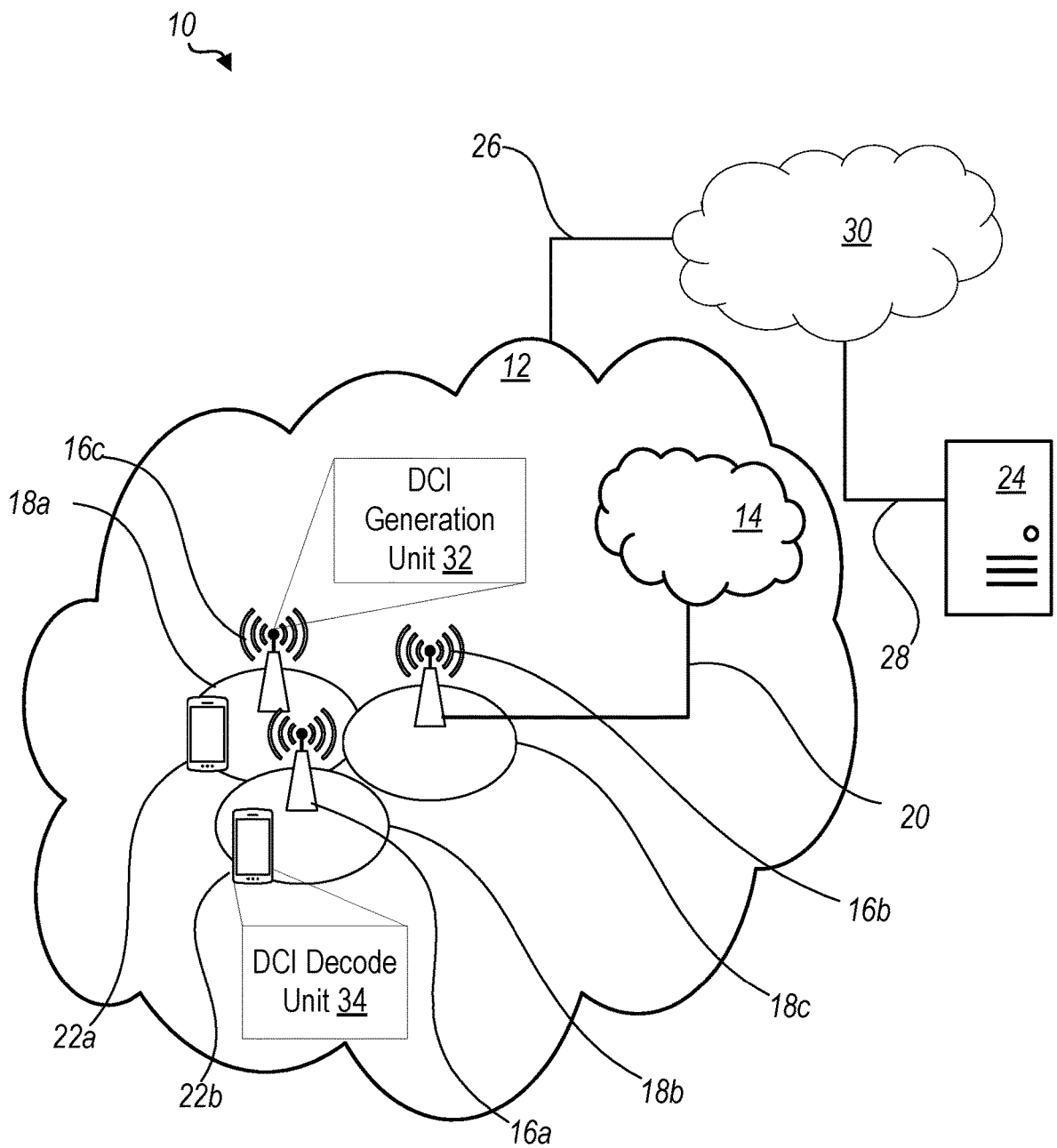
FIG. 1 is a schematic diagram of an exemplary network architecture illustrating a communication system connected via an intermediate network to a host computer according to the principles in the present disclosure.

As noted above, existing DCI size alignment procedures in 3GPP Rel-15 are limited to handling only existing fallback DCI formats 0_0/1_0 and non-fallback DCI formats 0_1/1_1. The existing DCI size alignment procedures are also limited to handling only the fixed limit on DCI sizes e.g., for the WD to monitor (no more than 4 sizes in total and no more than 3 sizes with C-RNTI).

Thus, some embodiments of the present disclosure provide techniques for DCI size alignment handling when a new DCI format having a different size from those of existing formats is introduced. The techniques in the present disclosure may also cover the cases when the limit on total number of DCI sizes for the WD to monitor differs (e.g., increases) from the existing limit.

Some embodiments of the DCI alignment procedure according to the present disclosure include the use of padding bits to differentiate, or align the DCI sizes, and/or additional rules to further align the DCI size, or skip to monitor/drop certain configured DCI formats.

Advantageously, some embodiments of the present disclosure can support appropriate handling of a DCI size alignment procedure when a new DCI format with a DCI size different from existing formats is introduced. Some embodiments may also extend DCI size alignment procedures to support different limits on the total number of DCI sizes that a WD can monitor within a wireless communication network cell.

Before describing in detail exemplary embodiments, it is noted that the embodiments reside primarily in combinations of apparatus components and processing steps related to DCI size handling. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate, and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, integrated access and backhaul (IAB) node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node. In some embodiments, the network node may comprise of an IAB node, a donor IAB node, a parent IAB node, and/or a child IAB node.

In some embodiments, the non-limiting terms wireless device (WD) or a user equipment (UE) are used interchangeably. Further, WD-specific and WD-specific may be used herein interchangeably. The WD or WD herein can be any type of wireless device capable of communicating with a network node or another WD over radio signals, such as wireless device (WD). The WD or WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB, relay node, access point, radio access point, Remote Radio Unit (RRU) Remote Radio Head (RRH).

In some embodiments, the terms "DCI format 0_2," "DCI format 1_2," "new DCI format" and "URLLC DCI format" are used herein interchangeably and may be used to indicate a DCI format configured for use in URLLC, and in particular, for URLLC WDs to monitor, or other types of physical downlink control channels (PDCCHs) that have a high reliability requirement similar to URLLC. In some embodiments, "DCI format 0_2" may be used to indicate a DCI format for UL scheduling grants and/or "DCI format 1_2" may be used to indicate a DCI format for DL scheduling assignments for URLLC WDs. It should be understood that use of the terms "DCI format 0_2," "DCI format 1_2," "new DCI format" and "URLLC DCI format" are merely exemplary and may be called by other names in implementation.

Although the description herein may be explained in the context of PDCCH channel, it should be understood that the principles may also be applicable to other channels, such as, for example, other types of control channels, or UL channels.

The term "signaling" used herein may comprise any of: high-layer signaling (e.g., via Radio Resource Control (RRC) or a like), lower-layer signaling (e.g., via a physical control channel or a broadcast channel), or a combination thereof. The signaling may be implicit or explicit. The signaling may further be unicast, multicast or broadcast. The signaling may also be directly to another node or via a third node.

In some embodiments, control information (e.g., DCI) on one or more resources may be considered to be transmitted in a message (e.g., DCI message) having a specific format. A message may comprise or represent bits representing payload information and/or coding bits, e.g., for error coding, and/or zero bit padding or appending or truncations.

Receiving (or obtaining) control information may comprise receiving one or more control information messages (e.g., an RRC monitoring parameter or DCI message). It may be considered that receiving control signaling comprises demodulating and/or decoding and/or detecting, e.g. blind detection of, one or more messages, in particular a message carried by the control signaling, e.g. based on an assumed set of resources, which may be searched and/or listened for the control information. It may be assumed that both sides of the communication are aware of the configurations, and may determine the set of resources, e.g. based on the reference size.

Configuring a terminal or wireless device (WD) or node may involve instructing and/or causing the wireless device or node to change its configuration, e.g., at least one setting and/or register entry and/or operational mode. A terminal or wireless device or node may be adapted to configure itself, e.g., according to information or data in a memory of the terminal or wireless device (e.g., the indication of the resource allocation as discussed above). Configuring a node or terminal or wireless device by another device or node or a network may refer to and/or comprise transmitting information and/or data and/or instructions to the wireless device or node by the other device or node or the network, e.g., allocation data (which may also be and/or comprise configuration data) and/or scheduling data and/or scheduling grants. Configuring a terminal may include sending allocation/configuration data to the terminal indicating which modulation and/or encoding to use. A terminal may be configured with and/or for scheduling data and/or to use, e.g., for transmission, scheduled and/or allocated uplink resources, and/or, e.g., for reception, scheduled and/or allocated downlink resources. Uplink resources and/or downlink resources may be scheduled and/or provided with allocation or configuration data.

A cell may be generally a communication cell, e.g., of a cellular or mobile communication network, provided by a node. A serving cell may be a cell on or via which a network node (the node providing or associated to the cell, e.g., base station or eNodeB) transmits and/or may transmit data (which may be data other than broadcast data) to a user equipment, in particular control and/or user or payload data, and/or via or on which a user equipment transmits and/or may transmit data to the node; a serving cell may be a cell for or on which the user equipment is configured and/or to which it is synchronized and/or has performed an access procedure, e.g., a random access procedure, and/or in relation to which it is in a RRC_connected or RRC_idle state, e.g., in case the node and/or user equipment and/or network follow the LTE-standard. One or more carriers (e.g., uplink and/or downlink carrier/s and/or a carrier for both uplink and downlink) may be associated to a cell.

Any two or more embodiments described in this disclosure may be combined in any way with each other.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

A method and apparatus are disclosed for handling DCI size alignment. In one embodiment, a network node is configured to perform a downlink control information, DCI, size alignment procedure based at least in part on a limit of a total number of different DCI sizes that a wireless device, WD, is configured to monitor; and transmit a DCI message, the DCI message generated according to the DCI alignment procedure. In one embodiment, a WD is configured to monitor a cell for a downlink control information, DCI, message; and receive and/or decode the DCI message, the DCI message being generated according to a DCI alignment procedure in which a size of the DCI is based at least in part on a limit of a total number of different DCI sizes that the WD is configured to monitor.

Referring now to the drawing figures, in which like elements are referred to by like reference numerals, there is shown in FIG. 1 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16c. A second WD 22b in coverage area 18b is wirelessly connectable to the corresponding network node 16a. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 1 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include a DCI generation unit 32 which is configured to perform a downlink control information, DCI, size alignment procedure based at least in part on a limit of a total number of different DCI sizes that the WD 22 is configured to monitor; and transmit a DCI message, the DCI message generated according to the DCI alignment procedure.

A wireless device 22 is configured to include a DCI decode unit 34 which is configured to monitor a cell for a downlink control information, DCI, message; and receive and/or decode the DCI message, the DCI message being generated according to a DCI alignment procedure in which a size of the DCI is based at least in part on a limit of a total number of different DCI sizes that the WD 22 is configured to monitor.

Example implementations, in accordance with an embodiment, of the WD 22, network node 16 and host computer 24 discussed in the preceding paragraphs will now be described with reference to FIG. 2. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and/or the wireless device 22. The processing circuitry 42 of the host computer 24 may include a monitor unit 54 configured to enable the service provider to observe, monitor, control, transmit to and/or receive from the network node 16 and/or the wireless device 22.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include DCI generation unit 32 configured to perform a downlink control information, DCI, size alignment procedure based at least in part on a limit of a total number of different DCI sizes that the WD 22 is configured to monitor; and transmit a DCI message, the DCI message generated according to the DCI alignment procedure.

In some embodiments, the limit of the total number of different DCI sizes that the WD 22 is configured to monitor is determined based at least in part on the capability of the WD 22. In some embodiments, the processing circuitry 68 is configured to: determine whether the WD 22 is configured to monitor a DCI format for ultra-reliable low latency communications (URLLC DCI format); and perform the DCI size alignment procedure based at least in part on one or more of: whether the URLLC DCI format comprises a downlink assignment DCI format that is of a same size as a size of an uplink grant DCI format; whether the URLLC DCI format is a same size as a size of a fallback DCI format; and/or whether the URLLC DCI format is a same size as a size of a non-fallback DCI format. In some embodiments, the processing circuitry 68 is configured to perform the DCI size alignment procedure by being configured to one or more of: adjust a size of a DCI transmission by padding at least one of a non-fallback DCI format and a URLLC DCI format with at least one zero bit; align a size of a URLLC DCI format for at least one of a downlink assignment and an uplink grant for the WD; exclude or drop at least one of a URLLC DCI format and a non-fallback DCI format from the DCI formats that the WD 22 monitors via radio resource control (RRC) signaling; and excluding or dropping at least one of a URLLC DCI format and a non-fallback DCI format from the DCI formats that the WD monitors based at least in part on a priority rule. In some embodiments, the limit of the total number of different DCI sizes that the WD 22 is configured to monitor is 3, 4, or 5 different DCI sizes.

In some embodiments, processing circuitry 68 is configured to perform the DCI size alignment procedure based at least in part on one or more of: if the limit is 5, a size of a URLLC DCI format in a WD-specific search space is not allowed to equal a size of a DCI format 0_0 or 0_1 in another WD-specific search space and the size of the URLLC DCI format in the WD-specific search space is not allowed to equal a size of a DCI format 0_1 or 1_1 in another WD-specific search space; if the limit is 4, align the size of the URLLC DCI format for uplink grants with the size of the URLLC DCI format for downlink assignments; and/or if the limit is 3, the size of the URLLC DCI format in the WD-specific search space is not allowed to equal the size of the DCI format 0_0 or 0_1 in another WD-specific search space and the size of the URLLC DCI format in the WD-specific search space is not allowed to equal the size of the DCI format 0_1 or 1_1 in another WD-specific search space.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include a DCI decode unit 34 configured to monitor a cell for a downlink control information, DCI, message; and receive and/or decode the DCI message, the DCI message being generated according to a DCI alignment procedure in which a size of the DCI is based at least in part on a limit of a total number of different DCI sizes that the WD 22 is configured to monitor.

In some embodiments, the limit of the total number of different DCI sizes that the WD 22 is configured to monitor is determined based at least in part on the capability of the WD 22. In some embodiments, the DCI message is in a DCI format for ultra-reliable low latency communications (URLLC DCI format) and the size of the DCI is aligned based at least in part on or more of: whether the URLLC DCI format comprises a downlink assignment DCI format that is of a same size as a size of an uplink grant DCI format; whether the URLLC DCI format is a same size as a size of a fallback DCI format; and/or whether the URLLC DCI format is a same size as a size of a non-fallback DCI format. In some embodiments, the DCI size alignment procedure includes one or more of: adjusting a size of a DCI transmission by padding at least one of a non-fallback DCI format and a URLLC DCI format with at least one zero bit; aligning a size of a URLLC DCI format for at least one of a downlink assignment and an uplink grant for the WD 22; excluding or dropping at least one of a URLLC DCI format and a non-fallback DCI format from the DCI formats that the WD 22 monitors via radio resource control (RRC) signaling; and excluding or dropping at least one of a URLLC DCI format and a non-fallback DCI format from the DCI formats that the WD 22 monitors based at least in part on a priority rule.

In some embodiments, the limit of the total number of different DCI sizes that the WD 22 is configured to monitor is 3, 4, or 5 different DCI sizes. In some embodiments, the DCI size alignment procedure is based at least in part on one or more of: if the limit is 5, a size of a URLLC DCI format in a WD-specific search space is not allowed to equal a size of a DCI format 0_0 or 0_1 in another WD-specific search space and the size of the URLLC DCI format in the WD-specific search space is not allowed to equal a size of a DCI format 0_1 or 1_1 in another WD-specific search space; if the limit is 4, align the size of the URLLC DCI format for uplink grants with the size of the URLLC DCI format for downlink assignments; and/or if the limit is 3, the size of the URLLC DCI format in the WD-specific search space is not allowed to equal the size of the DCI format 0_0 or 0_1 in another WD-specific search space and the size of the URLLC DCI format in the WD-specific search space is not allowed to equal the size of the DCI format 0_1 or 1_1 in another WD-specific search space.

Figure 2:
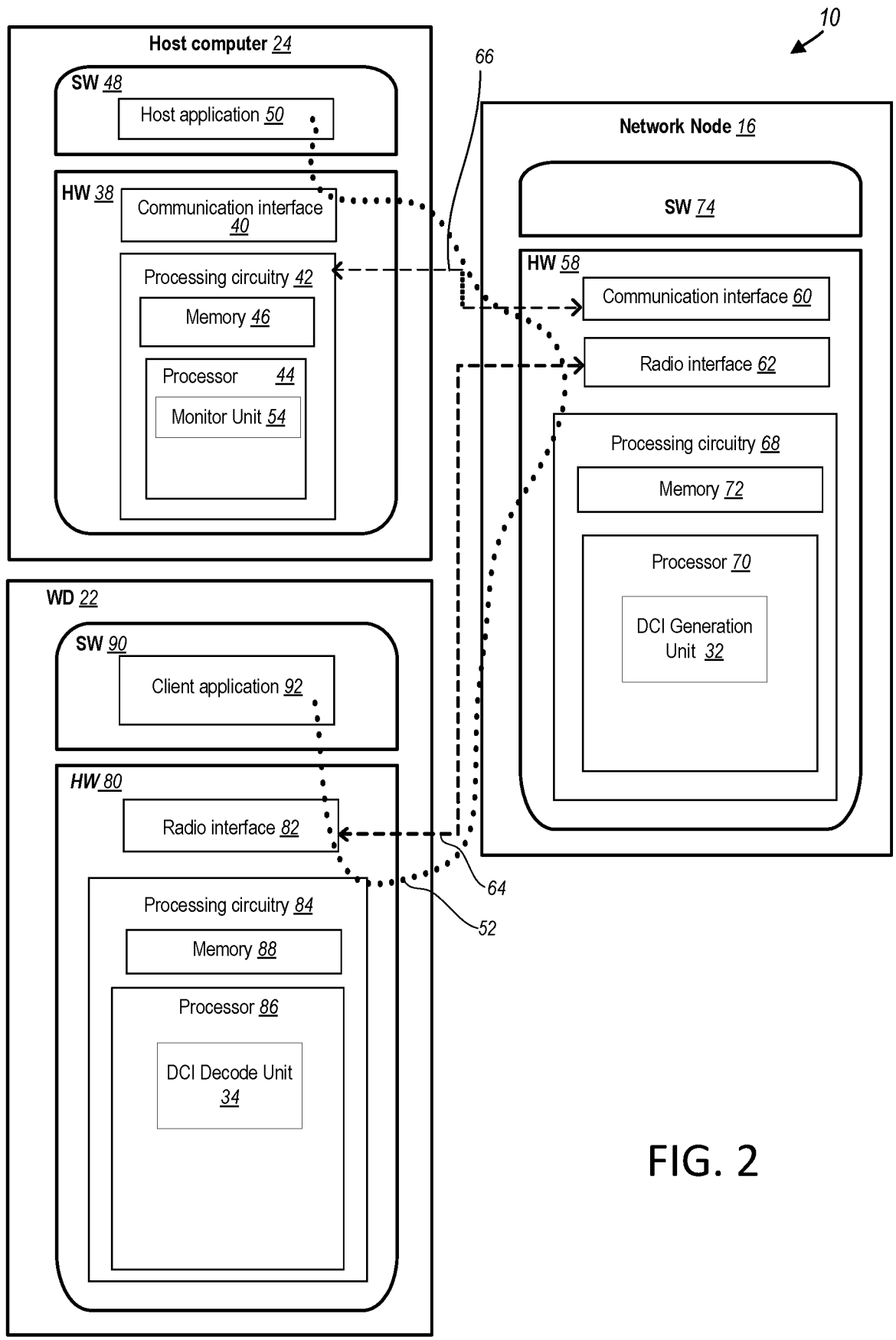
FIG. 2 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 2 and independently, the surrounding network topology may be that of FIG. 1.

In FIG. 2, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 1 and 2 show various "units" such as DCI generation unit 32, and DCI decode unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

FIG. 3 is a flowchart illustrating an exemplary method implemented in a communication system, such as, for example, the communication system of FIGS. 1 and 2, in accordance with one embodiment. The communication system may include a host computer 24, a network node 16 and a WD 22, which may be those described with reference to FIG. 2. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 114, associated with the host application 50 executed by the host computer 24 (Block S108).

FIG. 4 is a flowchart illustrating an exemplary method implemented in a communication system, such as, for example, the communication system of FIG. 1, in accordance with one embodiment. The communication system may include a host computer 24, a network node 16 and a WD 22, which may be those described with reference to FIGS. 1 and 2. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

FIG. 5 is a flowchart illustrating an exemplary method implemented in a communication system, such as, for example, the communication system of FIG. 1, in accordance with one embodiment. The communication system may include a host computer 24, a network node 16 and a WD 22, which may be those described with reference to FIGS. 1 and 2. In an optional first step of the method, the WD 22 receives input data provided by the host computer 24 (Block S116). In an optional substep of the first step, the WD 22 executes the client application 114, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 114 (Block S122). In providing the user data, the executed client application 114 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

FIG. 6 is a flowchart illustrating an exemplary method implemented in a communication system, such as, for example, the communication system of FIG. 1, in accordance with one embodiment. The communication system may include a host computer 24, a network node 16 and a WD 22, which may be those described with reference to FIGS. 1 and 2. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 7:
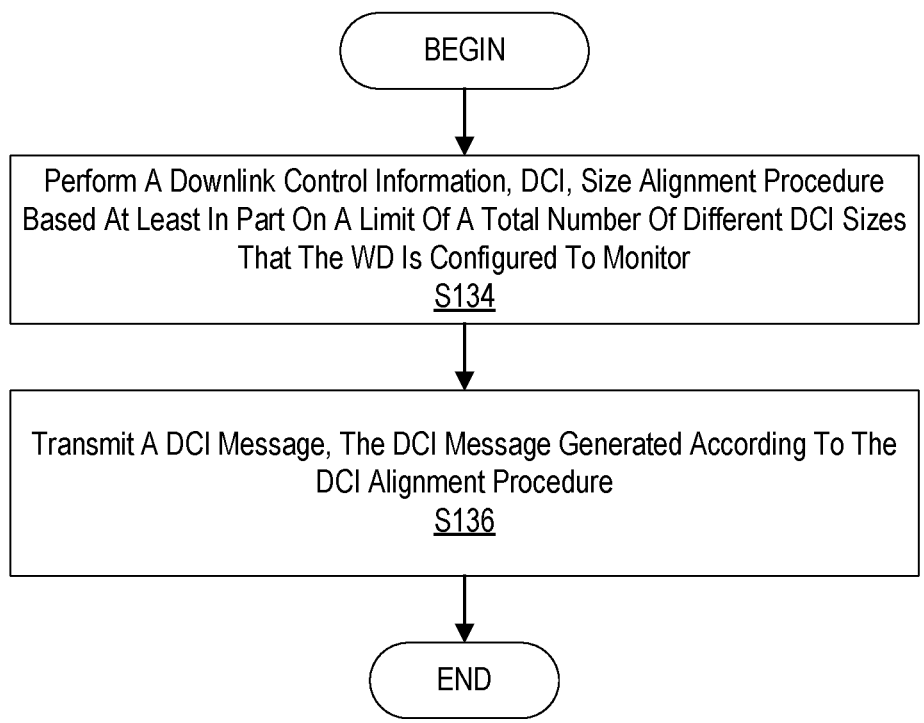
FIG. 7 is a flowchart of an exemplary process in a network node for DCI generation unit according to some embodiments of the present disclosure.

FIG. 7 is a flowchart of an exemplary process in a network node 16 for DCI size handling according to some embodiments of the present disclosure. One or more blocks and/or functions and/or methods performed by the network node 16 may be performed by one or more elements of network node 16 such as by DCI generation unit 32 in processing circuitry 68, processor 70, radio interface 62, etc. according to the example method. The example method may include performing (Block S134), such as via DCI generation unit 32 and/or processing circuitry 68, a downlink control information, DCI, size alignment procedure based at least in part on a limit of a total number of different DCI sizes that the WD is configured to monitor; and transmitting (Block S136), such as via radio interface 62, a DCI message, the DCI message generated, such as via DCI generation unit 32 and/or processing circuitry 68, according to the DCI alignment procedure.

In some embodiments, the limit of the total number of different DCI sizes that the WD 22 is configured to monitor is determined based at least in part on the capability of the WD 22. In some embodiments, the method further includes determining, such as via DCI generation unit 32 and/or processing circuitry 68, whether the WD 22 is configured to monitor a DCI format for ultra-reliable low latency communications (URLLC DCI format); and performing the DCI size alignment procedure based at least in part on one or more of: whether the URLLC DCI format comprises a downlink assignment DCI format that is of a same size as a size of an uplink grant DCI format; whether the URLLC DCI format is a same size as a size of a fallback DCI format; and/or whether the URLLC DCI format is a same size as a size of a non-fallback DCI format.

In some embodiments, the performing the DCI size alignment procedure further comprises one or more of: adjusting, such as via DCI generation unit 32 and/or processing circuitry 68, a size of a DCI transmission by padding at least one of a non-fallback DCI format and a URLLC DCI format with at least one zero bit; aligning, such as via DCI generation unit 32 and/or processing circuitry 68, a size of a URLLC DCI format for at least one of a downlink assignment and an uplink grant for the WD; excluding or dropping, such as via DCI generation unit 32 and/or processing circuitry 68, at least one of a URLLC DCI format and a non-fallback DCI format from the DCI formats that the WD 22 monitors via radio resource control (RRC) signaling; and excluding or dropping, such as via DCI generation unit 32 and/or processing circuitry 68, at least one of a URLLC DCI format and a non-fallback DCI format from the DCI formats that the WD 22 monitors based at least in part on a priority rule. In some embodiments, the limit of the total number of different DCI sizes that the WD 22 is configured to monitor is 3, 4, or 5 different DCI sizes.

In some embodiments, the performing the DCI size alignment procedure is based at least in part on one or more of: if the limit is 5, a size of a URLLC DCI format in a WD-specific search space is not allowed to equal a size of a DCI format 0_0 or 0_1 in another WD-specific search space and the size of the URLLC DCI format in the WD-specific search space is not allowed to equal a size of a DCI format 0_1 or 1_1 in another WD-specific search space; if the limit is 4, align the size of the URLLC DCI format for uplink grants with the size of the URLLC DCI format for downlink assignments; and/or if the limit is 3, the size of the URLLC DCI format in the WD-specific search space is not allowed to equal the size of the DCI format 0_0 or 01 in another WD-specific search space and the size of the URLLC DCI format in the WD-specific search space is not allowed to equal the size of the DCI format 0_1 or 1_1 in another WD-specific search space.

Figure 8:
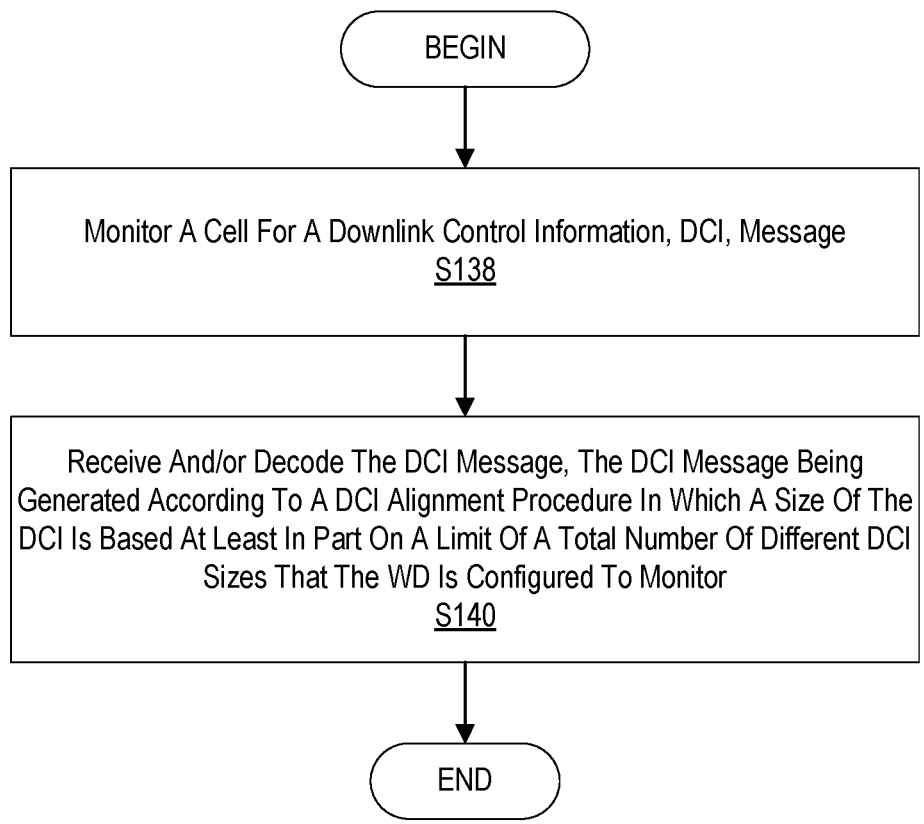
FIG. 8 is a flowchart of an exemplary process in a wireless device for DCI decode unit according to some embodiments of the present.

FIG. 8 is a flowchart of an exemplary process in a wireless device 22 for DCI size handling according to some embodiments of the present disclosure. One or more Blocks and/or functions and/or methods performed by WD 22 may be performed by one or more elements of WD 22 such as by DCI decode unit 34 in processing circuitry 84, processor 86, radio interface 82, etc. The example method includes monitoring (Block S138), such as via DCI decode unit 34 and/or processing circuitry 84, a cell for a downlink control information, DCI, message; and receiving, such as via radio interface 82, and/or decoding (Block S140), such as via DCI decode unit 34 and/or processing circuitry 84, the DCI message, the DCI message being generated according to a DCI alignment procedure in which a size of the DCI is based at least in part on a limit of a total number of different DCI sizes that the WD 22 is configured to monitor.

Figure 9:
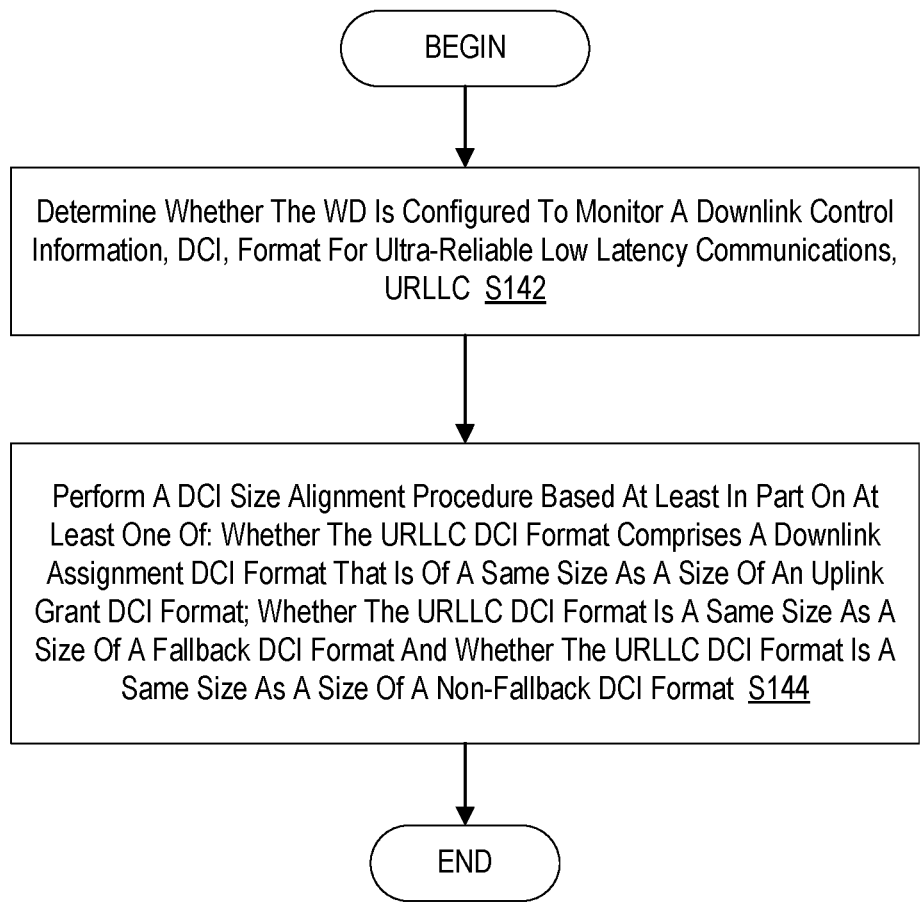
FIG. 9 is a flowchart of an exemplary process in a network node according to principles disclosed herein.

FIG. 9 is a flowchart of an exemplary process in a network node according to principles disclosed herein. One or more blocks and/or functions and/or methods performed by the network node 16 may be performed by one or more elements of network node 16 such as by DCI generation unit 32 in processing circuitry 68, processor 70, radio interface 62, etc. according to the example method. The process includes determining whether the WD is configured to monitor a downlink control information, DCI, format for ultra-reliable low latency communications, URLLC (Block S142). The process also includes performing a DCI size alignment procedure based at least in part on at least one of whether the URLLC DCI format comprises a downlink assignment DCI format that is of a same size as a size of an uplink grant DCI format; whether the URLLC DCI format is a same size as a size of a fallback DCI format; and whether the URLLC DCI format is a same size as a size of a non-fallback DCI format (Block S144).

Figure 10:
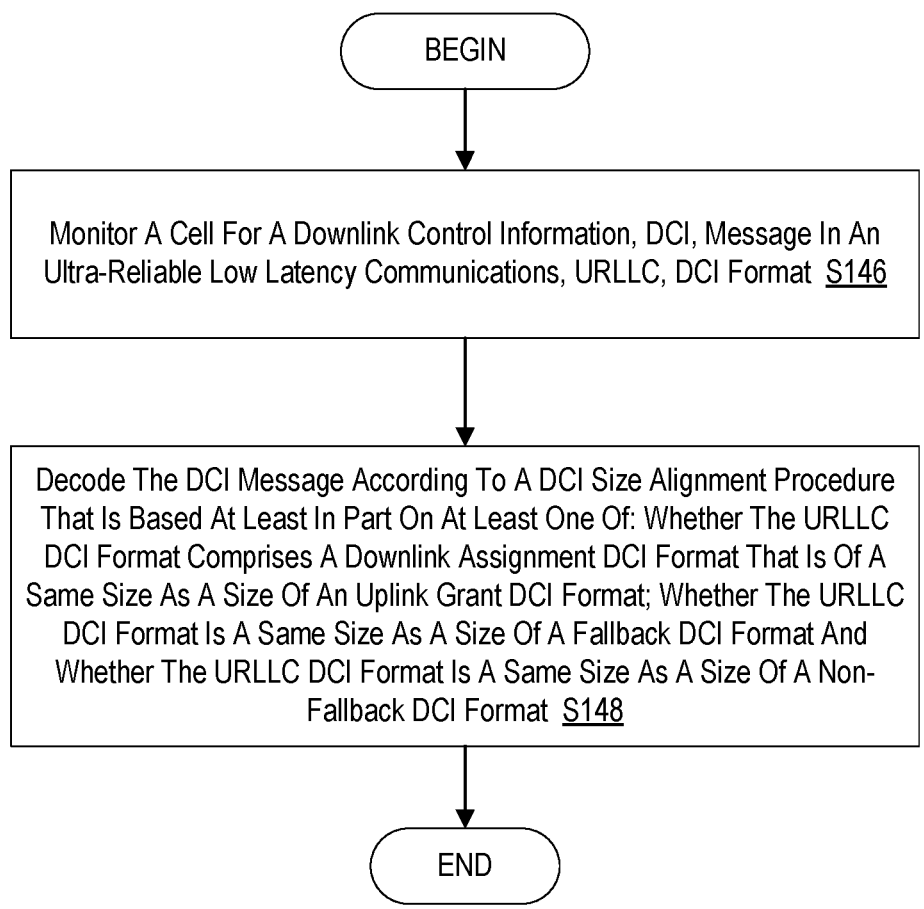
FIG. 10 is a flowchart of an exemplary process in a WD according to principles.

FIG. 10 is a flowchart of an exemplary process in a WD according to principles set forth herein. One or more Blocks and/or functions and/or methods performed by WD 22 may be performed by one or more elements of WD 22 such as by DCI decode unit 34 in processing circuitry 84, processor 86, radio interface 82, etc. The process includes monitoring a cell for a downlink control information, DCI, message in an ultra-reliable low latency communications, URLLC, DCI format (Block S146). The process also includes decoding the DCI message according to a DCI size alignment procedure that is based at least in part on at least one of whether the URLLC DCI format comprises a downlink assignment DCI format that is of a same size as a size of an uplink grant DCI format; whether the URLLC DCI format is a same size as a size of a fallback DCI format; and whether the URLLC DCI format is a same size as a size of a non-fallback DCI format (Block S146) In some embodiments, the limit of the total number of different DCI sizes that the WD 22 is configured to monitor is determined based at least in part on the capability of the WD 22. In some embodiments, the DCI message is in a DCI format for ultra-reliable low latency communications (URLLC DCI format) and the size of the DCI is aligned based at least in part on or more of: whether the URLLC DCI format comprises a downlink assignment DCI format that is of a same size as a size of an uplink grant DCI format; whether the URLLC DCI format is a same size as a size of a fallback DCI format; and/or whether the URLLC DCI format is a same size as a size of a non-fallback DCI format.

In some embodiments, the DCI size alignment procedure includes one or more of: adjusting a size of a DCI transmission by padding at least one of a non-fallback DCI format and a URLLC DCI format with at least one zero bit; aligning a size of a URLLC DCI format for at least one of a downlink assignment and an uplink grant for the WD 22; excluding or dropping at least one of a URLLC DCI format and a non-fallback DCI format from the DCI formats that the WD 22 monitors via radio resource control (RRC) signaling; and excluding or dropping at least one of a URLLC DCI format and a non-fallback DCI format from the DCI formats that the WD 22 monitors based at least in part on a priority rule. In some embodiments, the limit of the total number of different DCI sizes that the WD 22 is configured to monitor is 3, 4, or 5 different DCI sizes.

In some embodiments, the DCI size alignment procedure is based at least in part on one or more of: if the limit is 5, a size of a URLLC DCI format in a WD-specific search space is not allowed to equal a size of a DCI format 0_0 or 0_1 in another WD-specific search space and the size of the URLLC DCI format in the WD-specific search space is not allowed to equal a size of a DCI format 0_1 or 1_1 in another WD-specific search space; if the limit is 4, align the size of the URLLC DCI format for uplink grants with the size of the URLLC DCI format for downlink assignments; and/or if the limit is 3, the size of the URLLC DCI format in the WD-specific search space is not allowed to equal the size of the DCI format 0_0 or 0_1 in another WD-specific search space and the size of the URLLC DCI format in the WD-specific search space is not allowed to equal the size of the DCI format 0_1 or 1_1 in another WD-specific search space.

Having described some embodiments for handling DCI size according to some of the techniques provided in the present disclosure, a more detailed description of some of the embodiments is described below.

Figure 11:
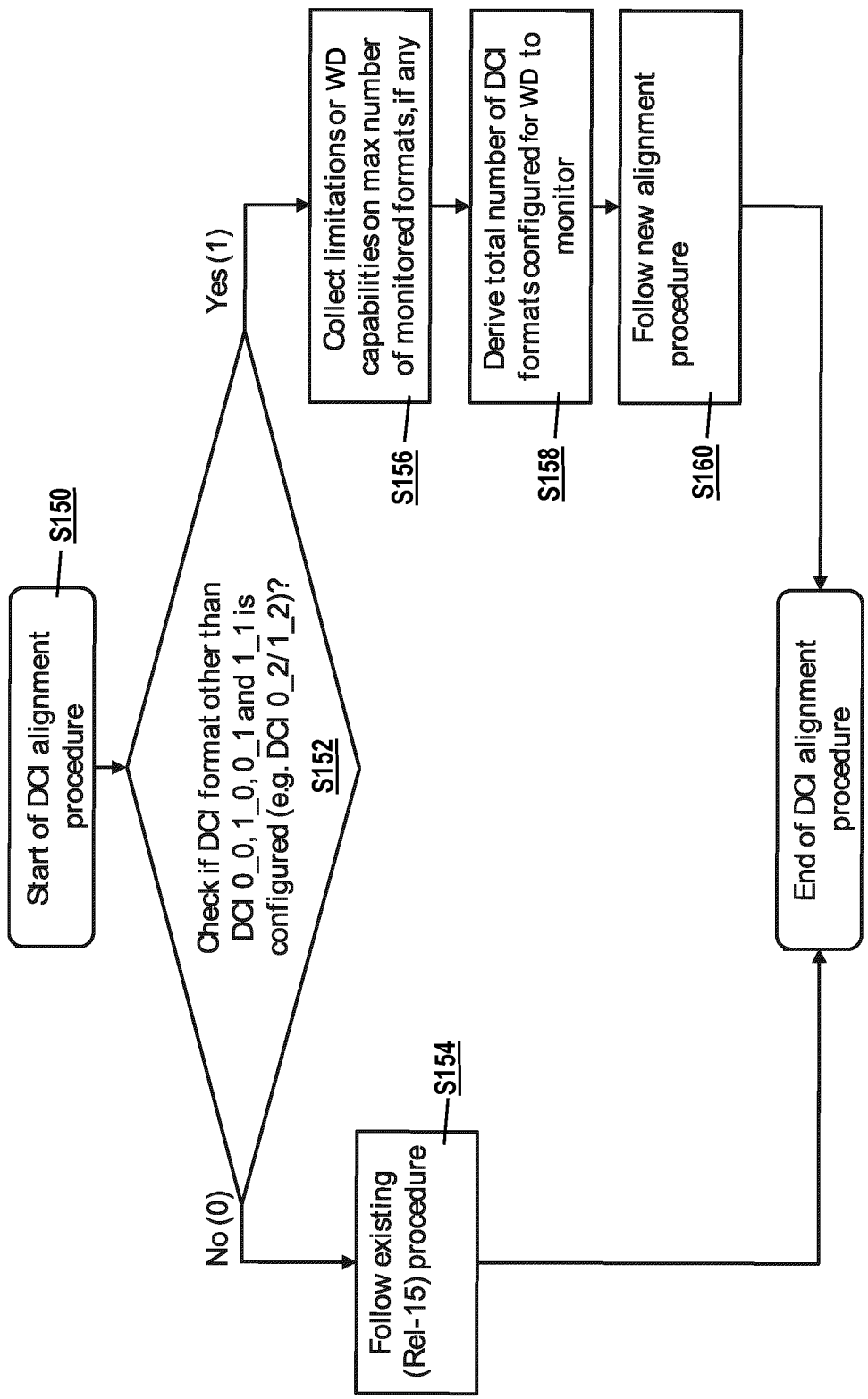
FIG. 11 illustrates an example of a modification of the current alignment procedure according to some of the embodiments of the present disclosure.

Some embodiments of the present disclosure are related, but not limited to, DCI size alignment procedure for NR. Introduction of new DCI format may require modification of the existing alignment procedure. A flowchart of an example embodiment according to the present disclosure is illustrated by FIG. 11. In some embodiments, the steps illustrated in the flowchart may be performed by the network node 16, e.g., for transmission of a physical downlink control channel (PDCCH).

Referring to FIG. 11, the DCI alignment procedure is started (Block S150). If a DCI format other than DCI 0_0, 0_1 and 1_1 is not configured, e.g., DCI 0_2 or 12 (Block S152), the DCI alignment procedure used is the existing, e.g., 3GPP Rel-15, procedure (Block S154). If a DCI format other than DCI 00, 0_1 and 1_1 is configured (Block S152), the limitations or the capability of the maximum number of monitored formats by the WD 22, if any, is collected (Block S156), the total number of DCI formats configured for the WD 22 to monitor is derived (Block S158), and a DCI alignment procedure described herein is followed (Block S160).

In one embodiment, the DCI size alignment procedure (e.g., performed by the network node 16) is based at least in part on the limit of total number of different DCI sizes which a WD, such as WD 22, can monitor. The limit may be determined based at least in part on a WD 22 capability.

In one embodiment, the DCI size alignment procedure is based at least in part on a total number of DCI formats configured for a WD, such as WD 22, to monitor.

The configuration of DCI formats for the WD 22 to monitor in WD-specific search space (USS) may depend on the limit of total number of different DCI sizes which the WD 22 can monitor. For example, the WD 22 with DCI size limit of 3 different sizes with C-RNTI is configured to monitor the fallback DCI format 0_0/1_0 and only one of the non-fallback format 0_1/1_1, or the new DCI format (referred as formats 0_2/1_2 here for simplicity).

In one embodiment, when a new DCI format 0_2/1_2 is configured for the WD 22 to monitor, the DCI size alignment procedure is based at least in part on the sizes of new DCI formats for downlink (DL) assignment (format 1_2) and uplink (UL) grant (format 0_2), e.g., whether the new DCI formats are of the same size or not and whether any of them are of the same size as fallback DCI format 0_0/1_0 or non-fallback format 0_1/1_1.

In one embodiment, when a new DCI format 0_2/1_2 is configured for the WD 22 to monitor, the DCI size alignment procedure (e.g., performed by the network node 16) may include one or more of the following:

Padding any non-fallback DCI formats (0_1/1_1 and/or new DCI format) with zero bits;

Aligning the size of new DCI formats for DL assignment and UL grant (e.g., making the size of the new DCI format for the DL assignment (e.g., DCI format 1_2) equal to the size of the new DCI format for the UL assignment (e.g., DCI format 0_2); and/or Excluding/dropping one of new DCI formats 0_2/1_2 or non-fallback DCI formats 0_1/1_1 from the DCI formats which the WD 22 monitors.

The dropping rule for a DCI format to monitor may be configured by radio resource control, RRC, signaling (e.g., network node 16 may transmit RRC signaling indicating to WD 22 to drop one or more DCI formats to monitor, or WD 22 may indicate to network node 16 that the WD 22 should drop one or more DCI formats to monitor, or the dropping rule may be predefined and known to both the WD 22 and network node 16). The dropping rule for the DCI format for the WD 22 to monitor may depend on one or more of the following:

service priority, e.g., dropping DCI format 0_1/1_1 for WD 22 operating with critical services or URLLC;

size of the DCI formats, e.g., dropping DCI format with larger sizes; and/or search space, e.g., dropping the DCI format configured in a certain WD 22 search space.

In some embodiments, when the new DCI format 0_2/1_2 is configured for the WD 22 to monitor in USS, the DCI size alignment procedure may include one or more of the following steps and/or sections depending on the limit on the total number of different DCI sizes which a WD 22 can monitor.

Limit of 5 Different Sizes or More for DCI with C-RNTI

The DCI size alignment procedure for handling DCI formats 0_0/1_0 and 0_1/1_1 follows that of 3GPP Rel-15 procedure in 3GPP TS 38.212, V15.4.0, (incorporated herein by reference), Section 7.3.1.0 (i.e., in Step 3 the total number of different DCI sizes include only DCI formats 0_0/1_0 and 0_1/11).

In addition, the size of DCI format 0_2 or 12 in a WD-specific search space is not allowed to equal to DCI format 0_0/0_1 in another WD-specific search space, e.g., if the size of new DCI format 0_2 or 1_2 monitored in USS equals that of DCI formats 0_0/1_0 in another USS, one bit of zero padding is appended to DCI format 02 or 1_2.

In addition, the size of DCI formats 0_2 or 1_2 after padding (if any) are not allowed to equal to DCI format 0_1 or 1_1 in another WD-specific search space, respectively, e.g., if the size of new DCI format 0_2 or 1_2 after padding (if any) equals that of DCI formats 0_1 or 11 respectively, one bit of zero padding is appended to DCI format 0_1 or 1_1. Or alternatively, one bit of zero padding is appended to DCI format 02 or 1_2.

Limit of 4 Different Sizes for DCI with C-RNTI

The DCI size alignment procedure for handling DCI formats 0_0/1_0 and 0_1/1_1 follows that of 3GPP Rel-15 procedure in 3GPP TS38.212, V15.4.0, Section 7.3.1.0 (i.e., in Step 3 the total number of different DCI sizes include only DCI formats 0_0/1_0 and 0_1/1_1).

In addition, the sizes of DCI formats 0_2 and 1_2 in a WD-specific search are manipulated to be aligned, e.g.:

if the number of information bits in the DCI format 0_2 is less than the size of the DCI format 1_2 monitored in a WD-specific search space for scheduling the same serving cell, zeros are appended (e.g., by network node 16) to the DCI format 0_2 until the payload size equals that of the DCI format 1_2.

if the number of information bits in the DCI format 1_2 is less than the size of the DCI format 0_2 monitored in a WD-specific search space for scheduling the same serving cell, zeros are appended (e.g., by network node 16) to the DCI format 1_2 until the payload size equals that of the DCI format 0_2.

In addition, the size of DCI format 0_2/1_2 in a WD-specific search space after being aligned is not allowed to equal to DCI format 0_0/0_1 in another WD-specific search space, e.g., if the size of new DCI format 0_2/1_2 after being aligned equals the size of DCI formats 0_0/1_0 in another USS, one bit of zero padding is appended (e.g., by network node 16) to DCI format 0_2/1_2.

In addition, the size of DCI format 0_2/1_2 after padding (if any) is not allowed to equal DCI format 0_1 or 11 in another WD-specific search space, e.g., if the size of new DCI format 0_/1_2 after padding (if any) equals the size of DCI formats 0_1 or 1_1, one bit of zero padding is appended (e.g., by network node 16) to DCI format 0_1 or 1_1. Or alternatively, one bit of zero padding is appended (e.g., by network node 16) to DCI format 0_2/1_2.

Limit of 3 Different Sizes for DCI with C-RNTI

The DCI size alignment procedure for handling DCI formats 0_0/1_0 and 0_1/1_1 follows that of the 3GPP Rel-15 procedure in 3GPP TS38.212, V15.4.0, Section 7.3.1.0 (i.e., in Step 3 the total number of different DCI sizes include only DCI formats 0_0/1_0 and 0_1/1_1).

In addition, the sizes of DCI formats 0_2 and 1_2 in a WD-specific search are manipulated to be aligned, e.g., in some embodiments:

if the number of information bits in the DCI format 0_2 is less than the payload size of the DCI format 1_2 monitored in a WD-specific search space for scheduling the same serving cell, zeros are appended (e.g., by network node 16) to the DCI format 0_2 until the payload size equals that of the DCI format 1_2.

if the number of information bits in the DCI format 1_2 is less than the payload size of the DCI format 0_2 monitored in a WD-specific search space for scheduling the same serving cell, zeros are appended (e.g., by network node 16) to the DCI format 1_2 until the payload size equals that of the DCI format 0_2.

In addition, the size of DCI format 0_2/12 in a WD-specific search space after being aligned may not be allowed to equal DCI format 0_0/0_1 in another WD-specific search space, e.g.:

if the size of new DCI format 0_2/1_2 after being aligned equals the size of DCI formats 0_0/1_0 in another USS, one bit of zero padding is appended (e.g., by network node 16) to DCI format 0_2/1_2.

In addition, the size of DCI format 0_2/1_2 after padding (if any) is not allowed to equal DCI format 0_1 or 1_1 in another WD-specific search space, e.g.:

if the size of new DCI format 0_2/1_2 after padding (if any) equals the size of DCI formats 0_1 or 1_1, one bit of zero padding is appended (e.g., by network node 16) to DCI format 0_1 or 1_1. Or alternatively, one bit of zero padding is appended (e.g., by network node 16) to DCI format 0_2/1_2.

In addition, certain DCI format(s) may be dropped, e.g.:
one of the new DCI formats 0_2/1_2 or non-fallback DCI formats 0_1/1_1 is excluded from DCI formats for the WD 22 to monitor.

In another embodiment, the previous embodiments can be adopted or adapted for DCI scrambling by one or a plurality of other RNTIs, e.g., Modulation Coding Scheme Cell RNTI (MCS-C-RNTI), Configured Scheduling RNTI (CS-RNTI), etc.

In another embodiment, DCI formats 0_2 and 1_2 are not allowed to be configured in any USS if DCI format 0_1 and 1_1 are configured in any USS, and vice versa. Then, in the DCI size alignment procedure (e.g., section 7.3.1.0 of 3GPP TS 38.212, V15.4.0), the DCI format 0_2 and 1_2 are used in place of DCI format 0_1 and 1_1. In this case, the size of DCI format 0_0 in a WD-specific search space is not allowed to equal the size of DCI format 0_2 in another WD-specific search space, and the size of DCI format 10 in a WD-specific search space is not allowed to equal the size of DCI format 1_2 in another WD-specific search space. One example implementation may be as follows:

```
WD-Specific    SEQUENCE {
    dci-Formats    ENUMERATED {formats0-0-And-1-0, formats0-2-And-1-2},
    ...
}
```

A wireless device, WD, may be a user equipment, UE, i.e. the term WD-Specific may generally also be understood as ue-Specific.

In one example use case, if both URLLC and Enhanced Mobile Broadband (eMBB) traffic are to be supported simultaneously, DCI formats 0_2 and 12 may be used to serve both URLLC and eMBB traffic. The techniques in the present disclosure may also be beneficial for use to support other types of traffic.

In another embodiment, DCI formats 0_0 and 1_0 are not configured in any USS. Thus, in such embodiments, the DCI formats 0_1 and 1_1 and DCI formats 0_2 and 1_2, can be configured simultaneously in USS. Limiting DCI formats 0_0 and 1_0 to CSS may allow DCI formats 0_2 and 1_2 to have the same size as DCI format 0_0 and 1_0, and still be distinguishable, since they are separated by the search space type (i.e., CSS versus USS). Then, DCI formats 0_2 and 1_2 may be manipulated (e.g., by the network node 16) to have the same size as DCI formats 0_0 and 1_0, where the manipulation includes (a) padding if DCI formats 0_2 and 1_2 sizes are too small; and (b) truncating if DCI formats 0_2 and 1_2 sizes are too large. One example implementation may be as follows:

```
searchSpaceType      CHOICE {
    common               SEQUENCE {
        dci-Format0-0-AndFormat1-0    SEQUENCE {
            ...
        }                                OPTIONAL, -- Need R
    ...
    WD-Specific          SEQUENCE {
        dci-Formats          ENUMERATED {formats0-1-And-1-1, formats0-2-And-1-2},
        ...
    }
    ...
}
```

In one typical use case, if both URLLC and eMBB traffic are to be supported simultaneously, DCI formats 0_1 and 1_1 may be used to serve eMBB traffic, while DCI formats 0_2 and 1_2 are used to serve URLLC traffic.

In some embodiments, if at one monitoring occasion (MO) the WD 22 has been configured with more than the total number of DCI sizes that WD 22 is capable of monitoring per MO, certain dropping rules can be applied. For example, the WD 22 may monitor the DCI sizes that have higher priority until the limitation is reached. Some examples implementations of such prioritization may include one or more of the following.

The priority can be search space dependent:
  one example is to monitor only search spaces with lower SearchSpaceId defined in PDCCH-Config;
  one example is to always prioritize common search spaces for paging and system information;
The priority can be scenario dependent:
  the WD 22 in a random access procedure may apply different priority rules than later when the WD 22 gets connected;
The priority can be fixed rules or configurable (via RRC);
The limitation can include:
  WD limitations:
    Maximum number of search spaces to monitor;
    Maximum number of blind decoding per MO;
    Maximum number of DCI sizes; and/or
    The limitation can be numerology and band combination dependent;
  Network configuration:
    RRC configuration to mitigate WD 22 decoding effort;
      e.g., during some period of time skip monitoring common search spaces of some of the specific search spaces; and/or
      e.g., during some period of time skip monitoring certain DCI format(s).

Thus, some embodiments of the present disclosure provide solutions for handling DCI size alignment when a new DCI format having a different size than the existing DCI formats is introduced into the network. Some of the embodiments of the present solution may be provided to support different limits on total DCI sizes which a WD 22 can monitor.

According to some embodiments, a network node 16 is configured to communicate with a wireless device, WD 22. The network node 16 includes processing circuitry 68 configured to determine whether the WD 22 is configured to monitor a downlink control information, DCI, format for ultra-reliable low latency communications, URLLC. The processing circuitry 68 is further configured to perform a DCI size alignment procedure based at least in part on at least one of: whether the URLLC DCI format comprises a downlink assignment DCI format that is of a same size as a size of an uplink grant DCI format; whether the URLLC DCI format is a same size as a size of a fallback DCI format; and whether the URLLC DCI format is a same size as a size of a non-fallback DCI format.

According to this aspect, in some embodiments, the DCI size alignment procedure includes adjusting a size of a DCI transmission by padding at least one of a non-fallback DCI format and a URLLC DCI format with at least one zero bit. In some embodiments, the padding includes aligning the size of non-fallback DCI formats 0_1 and 1_1. In some embodiments, the DCI size alignment procedure includes aligning a size of a URLLC DCI format for at least one of a downlink assignment and an uplink grant for the WD 22.

In some embodiments, the DCI size alignment procedure is based at least in part on a limit of a total number of DCI sizes that the WD 22 is configured to monitor. In some embodiments, when the limit is 3, the size of the URLLC DCI format in a WD-specific search space is not allowed to equal the size of DCI format 0_0 or 1_0 in another WD-specific search space. In some embodiments, the size of URLLC DCI format 0_2 or 1_2 in a WD-specific search space after being aligned is not allowed to equal the size of the DCI format 0_1 or 1_1 in another WD-specific search space. In some embodiments, the DCI size alignment procedure includes padding a shorter DCI format with zeros until the size of the shorter format is equal to a size of a longer DCI format. In some embodiments, the size of the DCI format 0_2 or 1_2 in a WD-specific search space after being aligned is not allowed to equal the size of the DCI format 0_1 or 1_1 in another WD-specific search space by appending one bit of zero padding to the DCI format 0_2 or 1_2. In some embodiments, when the limit is 4, a size of the URLLC DCI format for uplink grants is aligned with a size of the URLLC DCI format for downlink assignments. In some embodiments, the DCI alignment procedure ensures that a size of downlink DCI format 1_2 is not equal to a size of DCI format 1_0. In some embodiments, the DCI alignment procedure ensures that a size of uplink DCI format 0_2 is not equal to a size of DCI format 0_0. In some embodiments, when the limit is 5, a size of a URLLC DCI format in a WD-specific search space is not allowed to equal a size of a DCI format 0_0 or 1_0 in another WD-specific search space and the size of the URLLC DCI format in the WD-specific search space is not allowed to equal a size of a DCI format 0_1 or 1_1 in another WD-specific search space. In some embodiments, a size of DCI format 0_2 and a size of a DCI format 1_2 in a WD-specific search space are aligned. In some embodiments, when a number of information bits in the DCI format 0_2 is less than a payload size of the DCI format 1_2 monitored in the WD-specific search space for scheduling a same serving cell, the processing circuitry is further configured to append zeros to the DCI format 0_2 until a payload size of the DCI format 0_2 equals the payload size of the DCI format 1_2. In some embodiments, when a number of information bits in the DCI format 1_2 is less than a payload size of the DCI format 0_2 monitored in the WD-specific search space for scheduling a same serving cell, the processing circuitry is further configured to append zeros to the DCI format 1_2 until a payload size of the DCI format 12 equals the payload size of the DCI format 0_2.

According to another aspect, a method implemented in a network node 16 configured to communicate with a wireless device, WD 22, includes determining, via the processing circuitry 68, whether the WD 22 is configured to monitor a downlink control information, DCI, format for ultra-reliable low latency communications, URLLC. The method also includes performing, via the processing circuitry 68, a DCI size alignment procedure based at least in part on at least one of: whether the URLLC DCI format comprises a downlink assignment DCI format that is of a same size as a size of an uplink grant DCI format; whether the URLLC DCI format is a same size as a size of a fallback DCI format; and whether the URLLC DCI format is a same size as a size of a non-fallback DCI format. In some embodiments, the DCI size alignment procedure includes adjusting a size of a DCI transmission by padding at least one of a non-fallback DCI format and a URLLC DCI format with at least one zero bit. In some embodiments, the padding includes aligning the size of non-fallback DCI formats 0_1 and 1_1. In some embodiments, the DCI size alignment procedure includes aligning a size of a URLLC DCI format for at least one of a downlink assignment and an uplink grant for the WD 22. In some embodiments, the DCI size alignment procedure is based at least in part on a limit of a total number of DCI sizes that the WD 22 is configured to monitor. In some embodiments, when the limit is 3, the size of the URLLC DCI format in a WD-specific search space is not allowed to equal the size of DCI format 0_0 or 1_0 in another WD-specific search space. In some embodiments, the size of URLLC DCI format 0_2 or 12 in a WD-specific search space after being aligned is not allowed to equal the size of DCI format 0_1 or 1_1 in another WD-specific search space. In some embodiments, the DCI size alignment procedure includes padding a shorter DCI format with zeros until the size of the shorter format is equal to a size of a longer DCI format. In some embodiments, the size of DCI format 02 or 12 in a WD-specific search space after being aligned is not allowed to equal the size of DCI format 0_1 or 1_1 in another WD-specific search space by appending one bit of zero padding to the DCI format 0_2 or 1_2. In some embodiments, when the limit is 4, a size of the URLLC DCI format for uplink grants is aligned with a size of the URLLC DCI format for downlink assignments. In some embodiments, the DCI alignment procedure ensures that a size of downlink DCI format 1_2 is not equal to a size of DCI format 1_0. In some embodiments, the DCI alignment procedure ensures that a size of uplink DCI format 0_2 is not equal to a size of DCI format 0_0. In some embodiments, when the limit is 5, a size of a URLLC DCI format in a WD-specific search space is not allowed to equal a size of a DCI format 0_0 or 1_0 in another WD-specific search space and the size of the URLLC DCI format in the WD-specific search space is not allowed to equal a size of a DCI format 0_1 or 1_1 in another WD-specific search space. In some embodiments, a size of DCI format 0_2 and a size of a DCI format 1_2 in a WD-specific search space are aligned. In some embodiments, when a number of information bits in the DCI format 0_2 is less than a payload size of the DCI format 1_2 monitored in the WD-specific search space for scheduling a same serving cell, zeros are appended to the DCI format 0_2 until a payload size of the DCI format 0_2 equals the payload size of the DCI format 1_2. In some embodiments, when a number of information bits in the DCI format 1_2 is less than a payload size of the DCI format 0_2 monitored in the WD-specific search space for scheduling a same serving cell, zeros are appended to the DCI format 1_2 until a payload size of the DCI format 12 equals the payload size of the DCI format 0_2.

According to yet another aspect, a WD 22 is configured to communicate with a network node 16, the WD 22 comprising processing circuitry 84 configured to monitor a cell for a downlink control information, DCI, message in an ultra-reliable low latency communications, URLLC, DCI format, The processing circuitry 84 is further configured to decode the DCI message according to a DCI size alignment procedure that is based at least in part on at least one of: whether the URLLC DCI format comprises a downlink assignment DCI format that is of a same size as a size of an uplink grant DCI format; whether the URLLC DCI format is a same size as a size of a fallback DCI format; and whether the URLLC DCI format is a same size as a size of a non-fallback DCI format.

According to this aspect, in some embodiments, the DCI size alignment procedure includes at least adjusting a size of the DCI message by padding at least one of a non-fallback DCI format and a URLLC DCI format with at least one zero bit. In some embodiments, the DCI size alignment procedure includes at least aligning a size of a URLLC DCI format for at least one of a downlink assignment and an uplink grant for the WD 22. In some embodiments, the DCI size alignment procedure includes excluding or dropping at least one of a URLLC DCI format and a non-fallback DCI format from the DCI formats that the WD 22 monitors via radio resource control (RRC) signaling. In some embodiments, the DCI size alignment procedure includes excluding or dropping at least one of a URLLC DCI format and a non-fallback DCI format from the DCI formats that the WD 22 monitors based at least in part on a priority rule. In some embodiments, a size of the DCI message is based at least in part on a limit of a total number of different DCI sizes that the WD 22 is configured to monitor.

According to another aspect, a method in a WD 22 includes monitoring, via the processing circuitry 84, a cell for a downlink control information, DCI, message in an ultra-reliable low latency communications, URLLC, DCI format. The method further includes decoding, via the processing circuitry 84, the DCI message according to a DCI size alignment procedure that is based at least in part on at least one of: whether the URLLC DCI format comprises a downlink assignment DCI format that is of a same size as a size of an uplink grant DCI format; whether the URLLC DCI format is a same size as a size of a fallback DCI format; and whether the URLLC DCI format is a same size as a size of a non-fallback DCI format.

According to this aspect, in some embodiments, the DCI size alignment procedure includes at least adjusting a size of the DCI message by padding at least one of a non-fallback DCI format and a URLLC DCI format with at least one bit. In some embodiments, the DCI size alignment procedure includes at least aligning a size of a URLLC DCI format for at least one of a downlink assignment and an uplink grant for the WD 22. In some embodiments, the DCI size alignment procedure includes excluding or dropping at least one of a URLLC DCI format and a non-fallback DCI format from the DCI formats that the WD 22 monitors via radio resource control (RRC) signaling. In some embodiments, the DCI size alignment procedure includes excluding or dropping at least one of a URLLC DCI format and a non-fallback DCI format from the DCI formats that the WD 22 monitors based at least in part on a priority rule. In some embodiments, a size of the DCI message is based at least in part on a limit of a total number of different DCI sizes that the WD 22 is configured to monitor.

Some embodiments include the following:

Embodiment A1. A network node configured to communicate with a wireless device (WD), the network node configured to, and/or comprising a radio interface and/or comprising processing circuitry configured to:
  perform a downlink control information, DCI, size alignment procedure based at least in part on a limit of a total number of different DCI sizes that the WD is configured to monitor; and
  transmit a DCI message, the DCI message generated according to the DCI alignment procedure.

Embodiment A2. The network node of Embodiment A1, wherein the limit of the total number of different DCI sizes that the WD is configured to monitor is determined based at least in part on the capability of the WD.

Embodiment A3. The network node of any one of Embodiments A1 and A2, wherein the processing circuitry is configured to:
  determine whether the WD is configured to monitor a DCI format for ultra-reliable low latency communications (URLLC DCI format); and
  perform the DCI size alignment procedure based at least in part on one or more of
    whether the URLLC DCI format comprises a downlink assignment DCI format that is of a same size as a size of an uplink grant DCI format;
    whether the URLLC DCI format is a same size as a size of a fallback DCI format; and/or
    whether the URLLC DCI format is a same size as a size of a non-fallback DCI format.

Embodiment A4. The network node of any one of Embodiments A1-A3, wherein the processing circuitry is configured to perform the DCI size alignment procedure by being configured to one or more of:
  adjust a size of a DCI transmission by padding at least one of a non-fallback DCI format and a URLLC DCI format with at least one zero bit;
  align a size of a URLLC DCI format for at least one of a downlink assignment and an uplink grant for the WD;
  exclude or drop at least one of a URLLC DCI format and a non-fallback DCI format from the DCI formats that the WD monitors via radio resource control (RRC) signaling; and
  exclude or drop at least one of a URLLC DCI format and a non-fallback DCI format from the DCI formats that the WD monitors based at least in part on a priority rule.

Embodiment A5. The network node of any one of Embodiments A1-A4, wherein the limit of the total number of different DCI sizes that the WD is configured to monitor is 3, 4, or 5 different DCI sizes.

Embodiment A6. The network node of any one of Embodiments A1-A5, wherein processing circuitry is configured to perform the DCI size alignment procedure based at least in part on one or more of:
  if the limit is 5, a size of a URLLC DCI format in a WD-specific search space is not allowed to equal a size of a DCI format 0_0 or 0_1 in another WD-specific search space and the size of the URLLC DCI format in the WD-specific search space is not allowed to equal a size of a DCI format 0_1 or 1_1 in another WD-specific search space;
  if the limit is 4, align the size of the URLLC DCI format for uplink grants with the size of the URLLC DCI format for downlink assignments; and/or
  if the limit is 3, the size of the URLLC DCI format in the WD-specific search space is not allowed to equal the size of the DCI format 0_0 or 0_1 in another WD-specific search space and the size of the URLLC DCI format in the WD-specific search space is not allowed to equal the size of the DCI format 0_1 or 1_1 in another WD-specific search space.

Embodiment B1. A method implemented in a network node, the method comprising
  performing a downlink control information, DCI, size alignment procedure based at least in part on a limit of a total number of different DCI sizes that the WD is configured to monitor; and
  transmitting a DCI message, the DCI message generated according to the DCI alignment procedure.

Embodiment B2. The method of Embodiment B1, wherein the limit of the total number of different DCI sizes that the WD is configured to monitor is determined based at least in part on the capability of the WD.

Embodiment B3. The method of any one of Embodiments B1 and B2, further comprising:
  determining whether the WD is configured to monitor a DCI format for ultra-reliable low latency communications (URLLC DCI format); and
  performing the DCI size alignment procedure based at least in part on one or more of:
    whether the URLLC DCI format comprises a downlink assignment DCI format that is of a same size as a size of an uplink grant DCI format;
    whether the URLLC DCI format is a same size as a size of a fallback DCI format; and/or
    whether the URLLC DCI format is a same size as a size of a non-fallback DCI format.

Embodiment B4. The method of any one of Embodiments B1-B3, wherein the performing the DCI size alignment procedure further comprises one or more of:
  adjusting a size of a DCI transmission by padding at least one of a non-fallback DCI format and a URLLC DCI format with at least one zero bit;
  aligning a size of a URLLC DCI format for at least one of a downlink assignment and an uplink grant for the WD;
  excluding or dropping at least one of a URLLC DCI format and a non-fallback DCI format from the DCI formats that the WD monitors via radio resource control (RRC) signaling; and
  excluding or dropping at least one of a URLLC DCI format and a non-fallback DCI format from the DCI formats that the WD monitors based at least in part on a priority rule.

Embodiment B5. The method of any one of Embodiments B1-B4, wherein the limit of the total number of different DCI sizes that the WD is configured to monitor is 3, 4, or 5 different DCI sizes.

Embodiment B6. The method of any one of Embodiments B1-B5, wherein the performing the DCI size alignment procedure is based at least in part on one or more of:
  if the limit is 5, a size of a URLLC DCI format in a WD-specific search space is not allowed to equal a size of a DCI format 0_0 or 0_1 in another WD-specific search space and the size of the URLLC DCI format in the WD-specific search space is not allowed to equal a size of a DCI format 0_1 or 1_1 in another WD-specific search space;
  if the limit is 4, align the size of the URLLC DCI format for uplink grants with the size of the URLLC DCI format for downlink assignments; and/or
  if the limit is 3, the size of the URLLC DCI format in the WD-specific search space is not allowed to equal the size of the DCI format 0_0 or 0_1 in another WD-specific search space and the size of the URLLC DCI format in the WD-specific search space is not allowed to equal the size of the DCI format 0_1 or 1_1 in another WD-specific search space.

Embodiment C1. A wireless device (WD) configured to communicate with a network node, the WD configured to, and/or comprising a radio interface and/or processing circuitry configured to:
  monitor a cell for a downlink control information, DCI, message; and
  receive and/or decode the DCI message, the DCI message being generated according to a DCI alignment procedure in which a size of the DCI is based at least in part on a limit of a total number of different DCI sizes that the WD is configured to monitor.

Embodiment C2. The WD of Embodiment C1, wherein the limit of the total number of different DCI sizes that the WD is configured to monitor is determined based at least in part on the capability of the WD.

Embodiment C3. The WD of any one of Embodiments C1 and C2, wherein the DCI message is in a DCI format for ultra-reliable low latency communications (URLLC DCI format) and the size of the DCI is aligned based at least in part on or more of:
  whether the URLLC DCI format comprises a downlink assignment DCI format that is of a same size as a size of an uplink grant DCI format;
  whether the URLLC DCI format is a same size as a size of a fallback DCI format; and/or
  whether the URLLC DCI format is a same size as a size of a non-fallback DCI format.

Embodiment C4. The WD of any one of Embodiments C1-C3, wherein the DCI size alignment procedure includes one or more of:
  adjusting a size of a DCI transmission by padding at least one of a non-fallback DCI format and a URLLC DCI format with at least one zero bit;
  aligning a size of a URLLC DCI format for at least one of a downlink assignment and an uplink grant for the WD;
  excluding or dropping at least one of a URLLC DCI format and a non-fallback DCI format from the DCI formats that the WD monitors via radio resource control (RRC) signaling; and
  excluding or dropping at least one of a URLLC DCI format and a non-fallback DCI format from the DCI formats that the WD monitors based at least in part on a priority rule.

Embodiment C5. The WD of any one of Embodiments C1-C4, wherein the limit of the total number of different DCI sizes that the WD is configured to monitor is 3, 4, or 5 different DCI sizes.

Embodiment C6. The WD of any one of Embodiments C1-C5, wherein the DCI size alignment procedure is based at least in part on one or more of:
  if the limit is 5, a size of a URLLC DCI format in a WD-specific search space is not allowed to equal a size of a DCI format 0_0 or 0_1 in another WD-specific search space and the size of the URLLC DCI format in the WD-specific search space is not allowed to equal a size of a DCI format 0_1 or 1_1 in another WD-specific search space;
  if the limit is 4, align the size of the URLLC DCI format for uplink grants with the size of the URLLC DCI format for downlink assignments; and/or
  if the limit is 3, the size of the URLLC DCI format in the WD-specific search space is not allowed to equal the size of the DCI format 0_0 or 0_1 in another WD-specific search space and the size of the URLLC DCI format in the WD-specific search space is not allowed to equal the size of the DCI format 0_1 or 1_1 in another WD-specific search space.

Embodiment D1. A method implemented in a wireless device (WD), the method comprising:
  monitoring a cell for a downlink control information, DCI, message; and
  receiving and/or decoding the DCI message, the DCI message being generated according to a DCI alignment procedure in which a size of the DCI is based at least in part on a limit of a total number of different DCI sizes that the WD is configured to monitor.

Embodiment D2. The method of Embodiment D1, wherein the limit of the total number of different DCI sizes that the WD is configured to monitor is determined based at least in part on the capability of the WD.

Embodiment D3. The method of any one of Embodiments D1 and D2, wherein the DCI message is in a DCI format for ultra-reliable low latency communications (URLLC DCI format) and the size of the DCI is aligned based at least in part on or more of:
- whether the URLLC DCI format comprises a downlink assignment DCI format that is of a same size as a size of an uplink grant DCI format;
- whether the URLLC DCI format is a same size as a size of a fallback DCI format; and/or
- whether the URLLC DCI format is a same size as a size of a non-fallback DCI format.

Embodiment D4. The method of any one of Embodiments D1-D3, wherein the DCI size alignment procedure includes one or more of:
- adjusting a size of a DCI transmission by padding at least one of a non-fallback DCI format and a URLLC DCI format with at least one zero bit;
- aligning a size of a URLLC DCI format for at least one of a downlink assignment and an uplink grant for the WD;
- excluding or dropping at least one of a URLLC DCI format and a non-fallback DCI format from the DCI formats that the WD monitors via radio resource control (RRC) signaling; and
- excluding or dropping at least one of a URLLC DCI format and a non-fallback DCI format from the DCI formats that the WD monitors based at least in part on a priority rule.

Embodiment D5. The method of any one of Embodiments D1-D4, wherein the limit of the total number of different DCI sizes that the WD is configured to monitor is 3, 4, or 5 different DCI sizes.

Embodiment D6. The method of any one of Embodiments D1-D5, wherein the DCI size alignment procedure is based at least in part on one or more of:
- if the limit is 5, a size of a URLLC DCI format in a WD-specific search space is not allowed to equal a size of a DCI format 0_0 or 0_1 in another WD-specific search space and the size of the URLLC DCI format in the WD-specific search space is not allowed to equal a size of a DCI format 0_1 or 1_1 in another WD-specific search space;
- if the limit is 4, align the size of the URLLC DCI format for uplink grants with the size of the URLLC DCI format for downlink assignments; and/or
- if the limit is 3, the size of the URLLC DCI format in the WD-specific search space is not allowed to equal the size of the DCI format 0_0 or 0_1 in another WD-specific search space and the size of the URLLC DCI format in the WD-specific search space is not allowed to equal the size of the DCI format 0_1 or 1_1 in another WD-specific search space.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:

| Abbreviation | Description |
| --- | --- |
| CRC | Cyclic Redundancy Check |
| C-RNTI | Cell Radio Network Temporary Identifier |
| CSS | Cell-specific Search Space |
| DCI | Downlink Control Information |
| PDCCH | Physical Downlink Control Channel |
| URLLC | Ultra-Reliable Low Latency Communication |
| USS | UE-specific Search |

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

The invention claimed is:

1. A network node configured to communicate with a wireless device (WD) according to the Third Generation Partnership Project (3GPP) New Radio (NR), the network node comprising processing circuitry configured to:
    determine whether the WD is configured to monitor a downlink control information (DCI) format 0_2 or 1_2 for ultra-reliable low latency communications (URLLC); and
    when the WD is configured to monitor a DCI format 0_2 or 1_2 for URLLC, then perform a DCI size alignment procedure to adjust a size of URLLC DCI format 0_2 or 1_2 in a WD-specific search space, wherein the size of URLLC DCI format 0_2 or 1_2 in the WD-specific search space after being aligned does not equal the size of DCI format 01 or 1_1 in another WD-specific search space.

2. The network node of claim 1, wherein the DCI size alignment procedure includes padding a shorter DCI format with zeros until the size of the shorter DCI format is equal to a size of a longer DCI format.

3. The network node of claim 1, wherein the DCI alignment procedure ensures that a size of downlink URLLC DCI format 1_2 is not equal to a size of fallback DCI format 1_0.

4. The network node of claim 1, wherein the DCI alignment procedure ensures that a size of uplink URLLC DCI format 0_2 is not equal to a size of DCI format 0_0.

5. The network node of claim 1, wherein, when the limit a limit of a total number of DCI sizes that the WD is configured to monitor is 5, the size of the URLLC DCI format 0_2 or 1_2 in a WD-specific search space is not allowed to equal the size of the fallback DCI format 0_0 or 1_0 in another WD-specific search space and the size of the URLLC DCI 0_2 or 1_2 format in the WD-specific search space is not allowed to equal the size of the non-fallback DCI format 0_1 or 1_1 in another WD-specific search space.

6. The network node of claim 1, wherein a size of URLLC DCI format 0_2 and a size of a URLLC DCI format 1_2 in a WD-specific search space are aligned.

7. The network node of claim 6, wherein, when a number of information bits in the DCI format 0_2 is less than a payload size of the DCI format 1_2 monitored in the WD-specific search space for scheduling a same serving cell, the processing circuitry is further configured to append zeros to the URLLC DCI format 0_2 until a payload size of the DCI format 0_2 equals the payload size of the URLLC DCI format 1_2.

8. The network node of claim 6, wherein, when a number of information bits in the URLLC DCI format 1_2 is less than a payload size of the URLLC DCI format 0_2 monitored in the WD-specific search space for scheduling a same serving cell, the processing circuitry is further configured to append zeros to the URLLC DCI format 1_2 until a payload size of the URLLC DCI format 1_2 equals the payload size of the URLLC DCI format 0_2.

9. A method implemented in a network node configured to communicate with a wireless device (WD) according to the Third Generation Partnership Project (3GPP) New Radio (NR), the method comprising:
    determining whether the WD is configured to monitor a downlink control information (DCI) format 0_2 or 1_2 for ultra-reliable low latency communications (URLLC); and
    when the WD is configured to monitor a DCI format 0_2 or 1_2 for URLLC, then performing a DCI size alignment procedure to adjust a size of URLLC DCI format 0_2 or 1_2 in a WD-specific search space, wherein the size of URLLC DCI format 0_2 or 1_2 in the WD-specific search space after being aligned that does not equal the size of DCI format 0_1 or 1_1 in another WD-specific search space.

10. The method of claim 9, wherein the DCI size alignment procedure includes padding a shorter DCI format with zeros until the size of the shorter DCI format is equal to a size of a longer DCI format.

11. The method of claim 9, wherein the DCI alignment procedure ensures that a size of downlink URLLC DCI format 1_2 is not equal to a size of the fallback DCI format 1_0.

12. The method of claim 9, wherein the DCI alignment procedure ensures that a size of uplink URLLC DCI format 0_2 is not equal to a size of the fallback DCI format 0_0.

13. The method of claim 9, wherein, when a limit of a total number of DCI sizes that the WD is configured to monitor is 5, the size of a URLLC DCI 0_2 or 1_2 format in a WD-specific search space is not allowed to equal a size of the fallback DCI format 0_0 or 1_0 in another WD-specific search space and the size of the URLLC DCI format 0_2 or 1_2 in the WD-specific search space is not allowed to equal a size of the non-fallback DCI format 0_1 or 1_1 in another WD-specific search space.

14. The method of claim 9, wherein a size of URLLC DCI format 0_2 and a size of a DCI format 1_2 in a WD-specific search space are aligned.

15. The method of claim 14, wherein, when a number of information bits in the URLLC DCI format 0_2 is less than a payload size of the URLLC DCI format 1_2 monitored in the WD-specific search space for scheduling a same serving cell, zeros are appended to the URLLC DCI format 0_2 until a payload size of the URLLC DCI format 0_2 equals the payload size of the URLLC DCI format 1_2.

16. The method of claim 14, wherein, when a number of information bits in the URLLC DCI format 1_2 is less than a payload size of the URLLC DCI format 0_2 monitored in the WD-specific search space for scheduling a same serving cell, zeros are appended to the URLLC DCI format 1_2 until a payload size of the URLLC DCI format 1_2 equals the payload size of the URLLC DCI format 0_2.

17. A wireless device (WD) configured to communicate with a network node, according to the Third Generation Partnership Project (3GPP) New Radio (NR), the WD comprising processing circuitry configured to:
monitor a cell for a downlink control information (DCI) message in an ultra-reliable low latency communications (URLLC) DCI format 0_2 or 1_2; and
perform a DCI size alignment procedure to adjust a size of URLLC DCI format 0_2 or 1_2 in a WD-specific search space, wherein the size of URLLC DCI format 0_2 or 1_2 in the WD-specific search space after being aligned that does not equal the size of DCI format 0_1 or 1_1 in another WD-specific search space; and
decode the DCI message according to the DCI size alignment procedure.

18. The WD of claim 17, wherein the DCI size alignment procedure includes excluding or dropping at least one of the URLLC DCI 0_2 or 1_2 format and a non-fallback DCI format from the DCI formats that the WD monitors via radio resource control (RRC) signaling.

19. The WD of claim 17, wherein the DCI size alignment procedure includes excluding or dropping at least one of the URLLC DCI format 0_2 or 1_2 and a non-fallback DCI format 0_1 or 1_1 from the DCI formats that the WD monitors based at least in part on a priority rule.

20. A method in a wireless device (WD) configured to communicate with a network node according to the Third Generation Partnership Project (3GPP) New Radio (NR), the method comprising:
monitoring a cell for a downlink control information (DCI) message in an ultra-reliable low latency communications (URLLC) DCI 0_2 or 1_2 format; and
performing a DCI size alignment procedure to adjust a size of URLLC DCI format 0_2 or 1_2 in a WD-specific search space, wherein the size of URLLC DCI format 0_2 or 1_2 in the WD-specific search space after being aligned does not equal the size of DCI format 0_1 or 1_1 in another WD-specific search space; and
decoding the DCI message according to the DCI size alignment.

21. The method of claim 20, wherein the DCI size alignment procedure includes excluding or dropping at least one of a URLLC DCI format 0_2 or 1_2 and a non-fallback DCI format 0_1 or 1_1 from the DCI formats that the WD monitors via radio resource control (RRC) signaling.

22. The method of claim 20, wherein the DCI size alignment procedure includes excluding or dropping at least one of a URLLC DCI format 0_2 or 1_2 and a non-fallback DCI format 0_1 or 1_1 from the DCI formats that the WD monitors based at least in part on a priority rule.

* * * * *